(12) United States Patent
Abel et al.

(10) Patent No.: US 9,945,970 B1
(45) Date of Patent: Apr. 17, 2018

(54) METHOD AND APPARATUS FOR MODELING MICROSEISMIC EVENT LOCATION ESTIMATE ACCURACY

(75) Inventors: Jonathan S. Abel, Menlo Park, CA (US); Sean Coffin, Redwood City, CA (US); Yoomi Hur, Sunnyvale, CA (US)

(73) Assignee: SEISMIC INNOVATIONS, Menlo Park, CA (US)

( * ) Notice: Subject to any disclaimer, the term of this patent is extended or adjusted under 35 U.S.C. 154(b) by 677 days.

(21) Appl. No.: 13/598,580

(22) Filed: Aug. 29, 2012

Related U.S. Application Data

(60) Provisional application No. 61/528,730, filed on Aug. 29, 2011.

(51) Int. Cl.
*G01V 1/34* (2006.01)
*G01V 1/28* (2006.01)

(52) U.S. Cl.
CPC .................... *G01V 1/288* (2013.01)

(58) Field of Classification Search
CPC ........... G01V 1/34; G01V 1/345; G01V 1/288
USPC .......................................................... 367/14
See application file for complete search history.

(56) References Cited

U.S. PATENT DOCUMENTS

| | | | | |
|---|---|---|---|---|
| 3,453,614 A | * | 7/1969 | Bose ................................. | 341/9 |
| 3,460,013 A | * | 8/1969 | Gaylor .......................... | 318/561 |
| 4,036,057 A | * | 7/1977 | Morais .................. | G01N 29/14 |
| | | | | 73/587 |
| 4,649,524 A | * | 3/1987 | Vance ....................... | G01V 1/00 |
| | | | | 181/101 |
| 4,683,556 A | * | 7/1987 | Willis .............................. | 367/27 |
| 5,031,719 A | * | 7/1991 | Baria ........................ | G01V 1/52 |
| | | | | 181/102 |
| 5,583,825 A | * | 12/1996 | Carrazzone et al. ........... | 367/31 |
| 5,747,750 A | * | 5/1998 | Bailey ....................... | G01S 5/20 |
| | | | | 175/50 |
| 5,774,419 A | * | 6/1998 | Uhl ......................... | G01V 1/008 |
| | | | | 340/690 |

(Continued)

FOREIGN PATENT DOCUMENTS

| EP | 1 485 733 B1 | 12/2011 |
|---|---|---|
| EP | 2 784 552 A2 | 10/2014 |

(Continued)

OTHER PUBLICATIONS

Coffin, et al., "On the Accuracy of Microseismic Event Location Estimates", undated white paper, 1-18.

(Continued)

*Primary Examiner* — Luke D Ratcliffe
*Assistant Examiner* — Amie M NDure
(74) *Attorney, Agent, or Firm* — Foley & Lardner LLP; Mark J. Danielson

(57) ABSTRACT

The present invention relates generally to microseismic event analysis, and more particularly to a method and apparatus for modeling microseismic event location estimate accuracy. According to certain aspects, the present invention provides a framework for analytically studying microseismic source location estimation accuracy and further provides new geometric intuitions and quantitative relationships that aid in the understanding of this problem. These intuitions and expressions can be shown to be in agreement with current observations in the state of the art.

20 Claims, 12 Drawing Sheets

(56) References Cited

U.S. PATENT DOCUMENTS

| | | | | |
|---|---|---|---|---|
| 5,917,160 A * | 6/1999 | Bailey | G01S 5/20 | 181/112 |
| 5,996,726 A * | 12/1999 | Sorrells | G01V 1/02 | 175/40 |
| 6,002,063 A * | 12/1999 | Bilak | B09B 1/00 | 588/17 |
| 6,049,508 A * | 4/2000 | Deflandre | G01V 1/42 | 181/112 |
| 6,462,549 B1 * | 10/2002 | Curtis | G01V 3/082 | 181/122 |
| 6,488,116 B2 * | 12/2002 | Bailey | G01V 1/52 | 181/108 |
| 6,598,001 B1 * | 7/2003 | Deflandre | G01V 1/288 | 367/38 |
| 6,668,554 B1 * | 12/2003 | Brown | E21B 41/0064 | 60/641.2 |
| 6,885,918 B2 * | 4/2005 | Harmon | G01V 11/002 | 701/14 |
| 6,947,843 B2 * | 9/2005 | Fisher | G01V 1/306 | 702/13 |
| 6,985,816 B2 * | 1/2006 | Sorrells | G01V 1/30 | 702/14 |
| 7,026,951 B2 * | 4/2006 | Bailey | G01V 11/002 | 340/854.3 |
| 7,348,894 B2 * | 3/2008 | Bailey | E21B 47/12 | 340/854.3 |
| 7,391,675 B2 * | 6/2008 | Drew | G01V 1/008 | 367/40 |
| 7,457,195 B2 * | 11/2008 | Jones | G01V 1/008 | 367/38 |
| 7,486,589 B2 * | 2/2009 | Lee | G01V 11/00 | 367/35 |
| 7,643,374 B2 * | 1/2010 | Plona et al. | | 367/68 |
| 7,647,183 B2 * | 1/2010 | Jechumtalova | G01V 1/008 | 702/14 |
| 7,660,198 B2 * | 2/2010 | Arrowsmith | G01V 1/288 | 367/31 |
| 7,660,199 B2 * | 2/2010 | Drew | G01V 1/008 | 367/40 |
| 8,107,317 B2 * | 1/2012 | Underhill et al. | | 367/25 |
| 8,649,980 B2 * | 2/2014 | Gulati | G01V 1/28 | 702/11 |
| 8,705,316 B2 * | 4/2014 | Thornton et al. | | 367/61 |
| 8,800,652 B2 * | 8/2014 | Bartko et al. | | 166/250.1 |
| 2002/0011378 A1 * | 1/2002 | Bailey | G01V 1/16 | 181/108 |
| 2004/0006430 A1 * | 1/2004 | Harmon | G01V 11/002 | 702/14 |
| 2004/0008580 A1 * | 1/2004 | Fisher | G01V 1/306 | 367/56 |
| 2004/0125696 A1 * | 7/2004 | Jones | G01V 1/008 | 367/14 |
| 2005/0060099 A1 * | 3/2005 | Sorrells | G01V 1/30 | 702/14 |
| 2005/0115711 A1 * | 6/2005 | Williams | E21B 43/267 | 166/308.1 |
| 2005/0190649 A1 * | 9/2005 | Eisner | G01V 1/40 | 367/38 |
| 2005/0197781 A1 * | 9/2005 | Harmon | G01V 11/002 | 702/14 |
| 2006/0062084 A1 * | 3/2006 | Drew | G01V 1/008 | 367/68 |
| 2006/0081412 A1 * | 4/2006 | Wright | E21B 43/26 | 181/104 |
| 2006/0092765 A1 * | 5/2006 | Jones | G01V 1/008 | 367/31 |
| 2006/0285438 A1 * | 12/2006 | Arrowsmith | G01V 1/288 | 367/38 |
| 2007/0183260 A1 * | 8/2007 | Lee | G01V 11/00 | 367/25 |
| 2007/0215345 A1 * | 9/2007 | Lafferty | E21B 47/011 | 166/250.1 |
| 2008/0004847 A1 * | 1/2008 | Bradford | G01V 1/30 | 703/10 |
| 2008/0068928 A1 * | 3/2008 | Duncan | G01V 1/288 | 367/73 |
| 2008/0106973 A1 * | 5/2008 | Maisons | G01V 1/40 | 367/25 |
| 2008/0112263 A1 * | 5/2008 | Bergery | G01V 1/28 | 367/50 |
| 2008/0123469 A1 * | 5/2008 | Wibaux | G01V 1/008 | 367/38 |
| 2008/0149329 A1 * | 6/2008 | Cooper | E21B 43/267 | 166/250.01 |
| 2008/0151691 A1 * | 6/2008 | Eisner | G01V 1/30 | 367/38 |
| 2008/0159075 A1 * | 7/2008 | Underhill | G01V 1/26 | 367/50 |
| 2008/0247269 A1 * | 10/2008 | Chen | G01V 1/42 | 367/27 |
| 2008/0259727 A1 * | 10/2008 | Drew | G01V 1/008 | 367/25 |
| 2009/0010104 A1 * | 1/2009 | Leaney | G01V 1/364 | 367/47 |
| 2009/0048783 A1 * | 2/2009 | Jechumtalova | G01V 1/008 | 702/11 |
| 2009/0125240 A1 * | 5/2009 | den Boer | G01V 11/00 | 702/11 |
| 2009/0168599 A1 * | 7/2009 | Suarez | G01V 1/42 | 367/35 |
| 2009/0248312 A1 * | 10/2009 | Hsu | G01V 1/28 | 702/15 |
| 2009/0259406 A1 * | 10/2009 | Khadhraoui | G01V 1/288 | 702/14 |
| 2009/0296525 A1 * | 12/2009 | Eisner | G01V 1/366 | 367/41 |
| 2009/0299637 A1 * | 12/2009 | Dasgupta | G01V 1/008 | 702/12 |
| 2010/0103774 A1 * | 4/2010 | Haldorsen | G01V 1/42 | 367/75 |
| 2010/0157730 A1 * | 6/2010 | Bradford | G01V 1/30 | 367/38 |
| 2010/0238765 A1 * | 9/2010 | Grechka | G01V 1/284 | 367/38 |
| 2010/0252268 A1 * | 10/2010 | Gu | E21B 43/26 | 166/308.1 |
| 2010/0256964 A1 * | 10/2010 | Lee | G01V 11/00 | 703/10 |
| 2010/0262372 A1 * | 10/2010 | Le Calvez | G01V 1/288 | 702/14 |
| 2010/0262373 A1 * | 10/2010 | Khadhraoui | G01V 1/40 | 702/16 |
| 2010/0307755 A1 * | 12/2010 | Xu | E21B 43/26 | 166/308.1 |
| 2011/0317518 A1 * | 12/2011 | Guigne | G01V 1/48 | 367/35 |
| 2013/0215717 A1 | 8/2013 | Hofland et al. | | |
| 2014/0112099 A1 | 4/2014 | Hofland et al. | | |
| 2014/0278120 A1 | 9/2014 | Kahn et al. | | |
| 2016/0202373 A1 * | 7/2016 | Diller | G01V 1/288 | 367/56 |

FOREIGN PATENT DOCUMENTS

| | | | |
|---|---|---|---|
| GB | 2450707 A * | 1/2009 | G01V 1/40 |
| GB | 2 525 996 A | 11/2015 | |
| WO | WO 2004/070424 | 8/2004 | |
| WO | WO 2005/106533 | 11/2005 | |
| WO | WO 2008/124759 | 10/2008 | |
| WO | WO 2010/116236 | 10/2010 | |
| WO | WO 2011/077223 | 6/2011 | |
| WO | WO 2012/085848 | 6/2012 | |

OTHER PUBLICATIONS

Eisner, et al., "Uncertainties in Passive Seismic Monitoring", *The Leading Edge*, Jun. 2009, pp. 648-655.

(56) References Cited

OTHER PUBLICATIONS

Eisner, et al., "Determination of S-wave Slowness from a Linear Array of Borehole receivers", *Geophysics*, vol. 176, 2008, pp. 31-39.
Eisner, et al., "Comparison of Surface and Borehole Locations of Induced Seismicity", *Geophysical Prospecting*, 2010, pp. 809-820.
Grenchka, et al., "Data-Acquisition Design for Microseismic Monitoring", *The Leading Edge*, Mar. 2010, pp. 1-5.
Hur, et al., "An Analytic Model for Microseismic Event Location Estimate Accuracy", Oct. 2011, pp. 1-18.
Kidney, et al., "Impact of Distance Dependent Location Dispersion Error on Interpretation of Microseismic Event Distributions", *The Leading Edge*, Mar. 2010, pp. 1-5.
Maxwell, et al., "Microseismic Location Uncertainty", *CSEG Recorder*, Apr. 2009, pp. 41-46.
Maxwell, et al., "Key Criteria for a Successful Microseismic Project", *SPE Paper* 134695,Sep. 2010, pp. 1-16.
Rutledge, et al., "Hydraulic Stimulation of Natural Fractures as Revealed by Induced Microearthquakes", Carthage Cotton Valley Gas Field, East Texas, *Geophysics*, vol. 68, No. 2, 2003, pp. 1-37.

\* cited by examiner

METHOD AND APPARATUS FOR MODELING MICROSEISMIC EVENT LOCATION ESTIMATE ACCURACY

CROSS-REFERENCE TO RELATED APPLICATIONS

The present application claims priority to U.S. Provisional Application No. 61/528,730, filed Aug. 29, 2011, the contents of which are incorporated by reference herein in its entirety.

FIELD OF THE INVENTION

The present invention relates generally to microseismic event analysis, and more particularly to a method and apparatus for modeling and quantitatively measuring microseismic event location estimate accuracy.

BACKGROUND OF THE INVENTION

Production treatment methods such as hydraulic fracture stimulation, carbon dioxide injection, gas injection, and steam or water injection are currently being used on an increasing number of oil and gas asset classes to optimize resource extraction. During these recovery efforts subsequent changes in fluid saturation and pressure produce dynamic changes in the physical properties of the reservoir. An example of this is the passive microseismic energy that typically results from shear stress release on pre existing faults and fractures due to production or injection induced perturbations to the effective stress conditions. These stress changes may be due to reservoir depletion, water flooding or stimulation (i.e. hydraulic fracturing) operations. Accordingly, passive microseismic imaging has become widely employed during these recovery efforts, for example, using a hydraulic fracture and monitoring system.

Such a hydraulic fracture and monitoring system is preferably arranged with respect to at least first and second wellbores. The first wellbore traverses a formation with a zone that is scheduled for hydraulic fracture. A hydraulic fracture apparatus, for example, comprising a fracture fluid, a pump, and controls is coupled to the first wellbore. The second wellbore contains one or more, and preferably a plurality, of temporary or permanent seismic sensors (e.g. geophones). Alternatively, the sensors may be placed along a surface or possibly within the first wellbore. A communication cable such as a telemetry wire facilitates communication between the sensors and a computer data acquisition and control system. As a fracture job commences, fracture fluid is pumped into the first wellbore causing perturbations to the effective stress conditions, creating microseismic events as shear stress is released on pre-existing faults and fractures. The microseismic events create seismic waves that are received by the sensors.

The seismic signals received by the sensors may be used to monitor and map microseismic events caused by the fracture operation. Accordingly, based on the seismic signals received, computers, such as the computer data acquisition and control system, may run programs containing instructions, that, when executed, perform methods for monitoring, detecting, and locating microseismic events. An operator may receive results of the methods in real time as they are displayed on a monitor. The operator may, in turn, adjust hydraulic fracture parameters such as pumping pressure, stimulation fluid, and proppant concentrations to optimize wellbore stimulation based on the displayed information relating to detected and located seismic events.

Event source localization resides at the core of most microseismic monitoring and analysis techniques, where the spatial distribution and time evolution of estimated event locations are often used to infer regions of activity in a reservoir and to attempt to quantify the associated spatio-temporal changes to several important properties such as local stress fields, permeability matrices, fracture fairway connectivity, and the geometric extent of fracture growth. Due to background noise and modeling uncertainties, source location estimates will fluctuate statistically and exhibit variances about true source locations. Because interpretations based on these estimated event locations can have a large impact on resource management decisions, knowledge of the accuracy of such location estimates is of high importance.

The accuracy of microseismic location estimates is a topic of current research, and is a problem that has been approached through several methodologies including computational simulation, analysis of field measurements, and the application of analytic techniques. See, for example, Leo Eisner, Peter M. Duncan, Werner M. Heigl, and William R. Keller, "Uncertainties in passive seismic monitoring," The Leading Edge, June, 2009 (hereinafter "[1]"); James T. Rutledge and W. Scott Phillips, "Hydraulic stimulation of natural fractures as revealed by induced microearthquakes, Carthage Cotton Valley gas field, east Texas," Geophysics, Vol. 68, No. 2, 2003 (hereinafter "[2]"); Leo Eisner, Tomas Fischer, and James T. Rutledge, "Determination of S-wave slowness from a linear array of borehole receivers," Geophysics, 176, 31-39 (hereinafter "[3]"); Robert Kidney, Ulrich Zimmer and Neda Boroumand, "Impact of distance-dependent location dispersion error on interpretation of microseismic event distributions," The Leading Edge, March, 2010 (hereinafter "[4]"); Vladimir Grenchka, "Data-acquisition design for microseismic monitoring," The Leading Edge, March, 2010 (hereinafter "[5]"); Leo Eisner, B. J. Hulsey, Peter Duncan, Dana Jurick, Heigl Werner, William Keller, "Comparison of surface and borehole locations of induced seismicity," Geophysical Prospecting, 2010 (hereinafter "[6]"); Shawn Maxwell, Microseismic location uncertainty. CSEG Recorder, pp. 41-46, April, 2009 (hereinafter "[7]"); and S. C. Maxwell, B. Underhill, L. Bennett, C. Woerpel and A. Martinez, Key criteria for a successful microseismic project. SPE paper 134695, September 2010 (hereinafter "[8]").

In general, these previous studies have each tended to address location estimation accuracy through examination of one aspect or portion of the typical location estimation process such as optimal placement of a geophone array for microseismic monitoring, estimation of parameters describing observed signals such as times of arrival and particle polarizations, and how variance in the estimation of such parameters translates to uncertainty in resulting source location estimates.

Meanwhile, certain other approaches relating to microseismic event location analysis have been attempted. For example, WO2002/085848 and WO2011/077223 both describe statistical analyses of location estimates. In WO2002/085848, a collection of a large number of events are analyzed, and an estimate is performed to consider events that may not have been detected to update the statistics of the events. In WO2011/077223, events are plotted in 3D, and the bounds of various clusters of events are determined using statistics.

In other approaches, WO2004/070424 describes an approach to estimating times of arrival and includes an ad hoc technique for estimating uncertainty using a covariance of residuals. WO2010/116236 observes that P and S waves have different frequency content, but only uses this observation in an ad hoc way. And finally, WO2008/124759 describes conventional seismic analysis techniques that derive error ellipses around earthquake events. However, only a single result is provided, and there is no comprehensive method or framework for including additional parameters such as range, angle, sensor-source geometry, noise environment, etc.

A need remains, therefore, for a more robust and comprehensive framework for analytically studying microseismic source location estimation accuracy.

SUMMARY OF THE INVENTION

The present invention relates generally to microseismic event analysis, and more particularly to a method and apparatus for modeling microseismic event location estimate accuracy. According to certain aspects, the present invention provides a framework for analytically studying microseismic source location estimation accuracy and further provides new geometric intuitions and quantitative relationships that aid in the understanding of this problem. These intuitions and expressions can be shown to be in agreement with current observations in the state of the art.

In accordance with these and other aspects, a method for estimating the accuracy of estimates of a microseismic event location according to embodiments of the invention includes accepting the position of a sensor; accepting information about noise affecting a signal from the sensor; and computing the sensitivity of a geometric parameter relating the event and sensor position with respect to changes in the microseismic event position.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
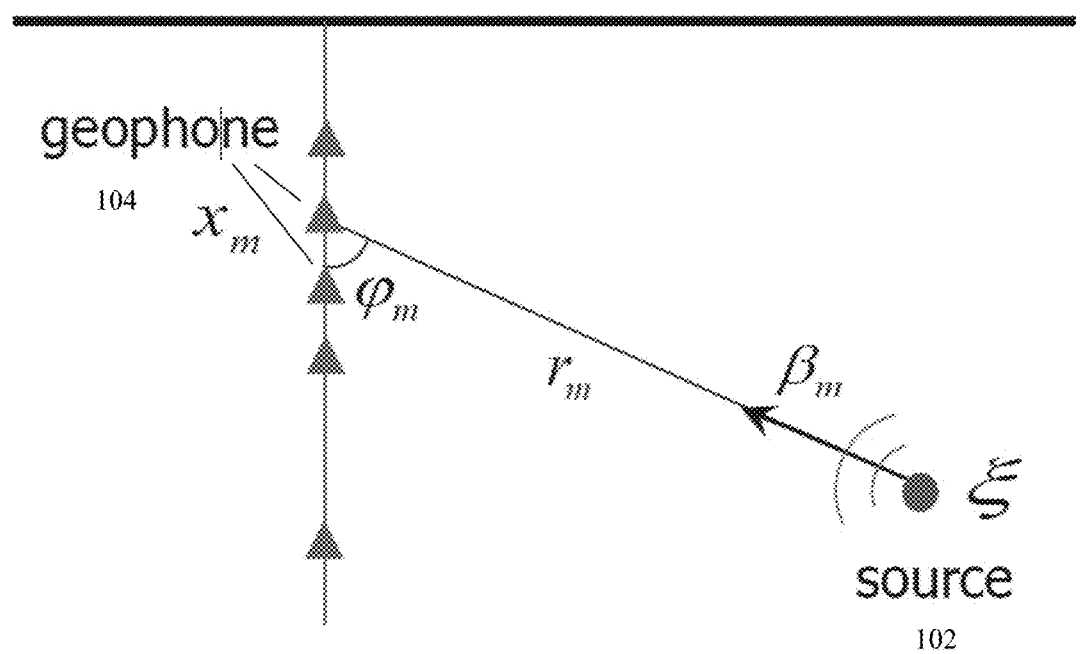
FIG. 1 illustrates an example source-geophone array geometry according to embodiments of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, the present invention approaches the topic of event localization accuracy as a single cohesive problem through application of the information inequality (see, e.g. [9]). The result is a set of analytic expressions that describe signal parameter and event location estimate variances as functions of the event array geometry and event signal and noise characteristics. The information inequality, often referred to as the Cramer-Rao Bound (CRB), places a lower bound on the mean square error of any estimator of parameters describing a given signal model. In the present case, this lower bound provides an analytic mechanism for quantitatively modeling and measuring the best achievable location estimate accuracy as a function of event-array geometry, and signal and noise properties. Additionally, there exists a range of circumstances in which the associated maximum likelihood estimator achieves the bound provided by the information inequality. As such, the information inequality can serve as a yardstick with which to judge the accuracy of event location estimators by comparing the variance achieved by their estimations to that given by a derived lower bound variance.

Microseismic Event Geometry

It is worthwhile to begin by describing the array geometry and signal model. We will presently assume a two-dimensional scenario in which each geophone contains a vertical and single horizontal component, with the horizontal component oriented in the same vertical plane as the source and geophone. This is equivalent to assuming that we have knowledge of the azimuthal angle of incidence and have, for example, applied a transformation to the two horizontal components of a 3C geophone package to acquire the horizontal component along that angle. While a formulation of the full three-dimensional problem, where estimation of the azimuthal angle is also required for localization, can readily be performed, this two-dimensional scenario allows for greater clarity of presentation and adequately captures the essential considerations of source localization accuracy according to embodiments of the invention. Presentation of the three-dimensional case will thus be omitted for the sake of clarity of the invention, and those skilled in the art will recognize that azimuthal angle estimation results would be analogous to those presented here. It should be further noted that although the figures depict linear sensor arrays, the expressions derived apply for arbitrary sets of receiver positions.

A. Array Geometry

FIG. 1 illustrates an example application of principles of the invention in a one-dimensional down-hole array of sensors. However, the invention is not limited to this example application, and can be extended to other sensor geometries such as arrays of three-axis sensors and/or surface arrays. Those skilled in the art will appreciate how to extend the principles of the invention to these and other applications after being taught by the present disclosure.

Referring to FIG. 1, consider a source 102 of transient microseismic energy, such as resulting from a fracture event, located at a position $\xi$ in the presence of a set of M geophones 104 at respective locations $x_m$, m=1, ..., M, as shown in FIG. 1. The mth sensor 104 is a distance $r_m$, $$r_m = \|x_m - \xi\| \tag{1}$$

from the source 102. The column of direction cosines pointing from the source to the mth sensor 104 is:

$$\beta_m = (x_m - \xi)/r_m = \begin{bmatrix} \cos\varphi_m \\ \sin\varphi_m \end{bmatrix} \tag{2}$$

where $\varphi_m$ denotes the angle of incidence at the mth sensor 104 as depicted in FIG. 1. The composite matrix of all source geophone direction cosines is $$B = [\beta_1 \ldots \beta_M]^T \tag{3}$$

Similarly, the direction cosine vector pointing perpendicular to the mth source-geophone direction is:

$$\beta_m^\perp = \begin{bmatrix} -\sin\varphi_m \\ \cos\varphi_m \end{bmatrix} \tag{4}$$

and the composite matrix of all such vectors is:

$$B^\perp = [\beta_1^\perp \ldots \beta_M^\perp]^T \tag{5}$$

For simplicity of analysis we initially assume a homogeneous and isotropic medium, with known P-wave and S-wave propagation speeds $v_p$ and $v_s$ respectively. While some discussion concerning extension of these results to laterally homogenous layered media is given below and a brief presentation of results for the case of uncertain propagation speeds is also given below, full treatment of these cases and other more complicated propagation media will be omitted for the sake of clarity of the invention, and those skilled in the art will be able to apply the techniques of the invention to these other cases after being taught by the present disclosure.

B. Signal Model

While the discussion below will consider the use of seismic signals in the form of direct P-waves and S-waves, the principles of the invention can be extended to other signal components such as headwaves, reflections, refractions, diffractions etc., as well as other types of seismic event information such as arrival times, polarizations, estimated ranges, estimated azimuth, etc. Those skilled in the art will appreciate how to extend the invention to these and other signal components and types of information after being taught by the present examples.

The vertical and horizontal time series recorded at the mth geophone 104, denoted by the two-element column vector $g_m(t)$, is modeled as the sum of P-wave and S-wave arrivals from the source, $p_m(t)$ and $s_m(t)$, in a background of additive noise $n_m(t)$, $$g_m(t) = p_m(t) + s_m(t) + n_m(t) \tag{6}$$

A set of T samples encompassing the full duration of the signals $p_m(t)$ and $s_m(t)$ are recorded, t=0, 1, ..., T−1, at a sampling rate $f_s$. The DFT of $g_m(t)$ is then the sum of the P-wave, S-wave, and noise transforms, $$G_m(\omega) = P_m(\omega) + S_m(\omega) + N_m(\omega) \tag{7}$$

where the T transform bins $\omega$=0, 1, ... T−1 represent frequencies in the range [0, $2\pi f_s(T-1/T)$]. For a more concise notation, we form composite 2M×1 column vectors G($\omega$), P($\omega$), and S($\omega$) by stacking the M individual geophone, P-wave, and S-wave transform vectors, respectively.

We assume that the arriving P-wave and S-wave signals are deterministic but unknown, derived from a common source signal generated by a microseismic event, and can be fully described by a set of parameters $\theta$. The additive noise is assumed to be random, drawn from a stationary Gaussian process, and independent sensor to sensor. Accordingly, the probability density of observing the geophone signal transforms at frequency $\omega$ is Gaussian, $$\wp(G(\omega);\theta) = \mathcal{N}(\mu(\omega;\theta), \Sigma(\omega)) \tag{8}$$

where the composite 2M×1 mean vector $\mu(\omega, \theta)$, given by $$\mu(\omega;\theta) = P(\omega) + S(\omega) \tag{9}$$

is the sum of the P-wave and S-wave arrival transforms and thus dependent on the parameters $\theta$, and the 2M×2M covariance matrix $E(\omega)$ is proportional to the noise power, $$\Sigma(\omega) = \sigma_n^2(\omega) I \tag{10}$$

reflecting our assumption that the noise is uncorrelated sensor to sensor and additionally implying that the independent noise observations at each sensor have a common power spectra. It should be noted that the assumption of uncorrelated sensor noise is make for convenience and clarity of explanation. In practice, the sensor noise powers may be different sensor-to-sensor and may be correlated across sensors, particularly at low frequencies. Extension to the case of a general noise covariance will be clear to those skilled in the art.

The DFT bins G(ω) are mutually independent, and so the probability of observing the entire set of frequency bins is the product of the probabilities of observing each of the individual bins, $$\wp(G(\omega), \omega = [0, 1, \ldots, T-1]; \theta) = \prod_{\omega=0}^{T-1} \wp(G(\omega); \theta) \quad (11)$$

The physical mechanism that gives rise to the microseismic waveforms is assumed to occur rapidly over some distance and accordingly radiates P and S disturbances into the surrounding rock that are scaled in time according to their propagation velocities. These radiated signals are then transformed by their respective radiation patterns, propagation losses and delays, and are scaled according to their polarizations and arrival direction. Accordingly, we model the mth P and S wave transforms as $$P_m(\omega) = \beta_m \alpha_p e^{-j\omega r_m/v_p} \cdot \psi(\omega/v_p) \quad (12)$$

$$S_m(\omega) = \beta_m^\perp \alpha_s e^{-j\omega r_m/v_s} \cdot \psi(\omega/v_s) \quad (13)$$

where ψ(k) represents the microseismic pulse transform as a function of wavenumber k, which is stretched according to the respective propagation speeds to form the P-wave and S-wave pulses and includes any frequency-dependent propagation losses common to both waveforms, the constants $\alpha_p$ and $\alpha_s$ embody frequency-independent propagation losses and radiation pattern effects, the factors exp $\{-j\omega r_m/v_p\}$ and exp $\{-j\omega r_m/v_s\}$ represent the P-wave and S-wave propagation times between the source and mth geophone, and the geophone vertical and horizontal axis dipole responses are incorporated via the direction cosines $\beta_m$ and $\beta_m^\perp$. This model then gives the mth geophone mean spectrum as $$\mu_m(\omega;\theta) = \beta_m \alpha_p e^{-j\omega r_m/v_p} \cdot \psi(\omega/v_p) + \beta_m^\perp \alpha_s e^{-j\omega r_m/v_s} \cdot \psi(\omega/v_s) \quad (14)$$

In the following, we will consider estimating either the source location, ξ, and generating pulse spectrum, ψ(k), or the source location, pulse spectrum, and the speeds $v_p$ and $v_s$, given an observed set of signal spectra, G(ω), with all other parameters assumed to be known.

Information Inequality

A. Definition

Given a set of observations g drawn from a probability density dependent on parameters θ, the variance of any unbiased estimate of the parameters is bounded below by the information inequality, commonly referred to as the Cramer-Rao bound (CRB), $$\text{Var}\{\hat{\theta}\} \geq J_\theta^{-1} \quad (15)$$

Here, $J_\theta$ is the Fisher information matrix for parameters θ, $$J_\theta = E\left\{\frac{\partial \ln \wp}{\partial \theta} \cdot \frac{\partial \ln \wp}{\partial \theta^\top}\right\} \quad (16)$$

where E{•} denotes expectation.

The Fisher information is the expected square sensitivity of the log probability density to changes in the parameters. If the probability density was very sensitive to such changes—i.e., if the data looked very different for different parameters, one would expect that the parameters could be accurately estimated from the observed data. In this case, the Fisher information would be large and the bound variance small. Conversely, if the probability density of observed data were insensitive to changes in the parameters θ, a small Fisher information and large bound variance would result.

In the present analysis, we will use the fact that for Gaussian observations G(ω) with mean dependent on parameters θ, the Fisher information for θ at frequency ω is $$J_\theta(\omega) = \frac{\partial \mu^\top(\omega)}{\partial \theta} \Sigma^{-1}(\omega) \frac{\partial \mu(\omega)}{\partial \theta^\top} \quad (17)$$

Additionally, because the observations G(ω) are statically independent frequency to frequency, the Fisher Information at each frequency add and we have that the total Fisher information for the parameters θ is $$J_\theta = \sum_{\omega=0}^{T-1} J_\theta(\omega) = \sum_{\omega=0}^{T-1} \frac{1}{\sigma_n^2(\omega)} \cdot \frac{\partial \mu^\top(\omega)}{\partial \theta} \frac{\partial \mu(\omega)}{\partial \theta^\top} \quad (18)$$

where the form of the noise covariance $\Sigma(\omega) = \sigma_n^2(\omega)I$ from (10) has been used.

B. Methods of Application of the Information Inequality

The bound provided by the information inequality is useful in two main ways. Firstly, it provides an analytic expression for the minimum estimate variance achievable by any unbiased estimator of parameters describing the observed signal. Given a reasonable signal model, this property allows for the determination of the extent to which estimates made from signal observations can be accurate, and thus relevant or useful. For example, the lower bound on location estimate variance described here for microseismic events can be used to determine the maximum reliability, or quantitative measure, of event localizations that occur in spatial regions of interest. Events which are localized as occurring in regions where estimate variance is shown to be unreasonably large or with a particular orientation can then be more appropriately interpreted.

Secondly, there generally will exist conditions in which the maximum likelihood estimate of the parameters, $\theta_{ML}$, will have variance approximating that of the lower bound given by the information inequality. An estimator which achieves the bound variance is said to be efficient, and the set of conditions in which this can occur is called the small-error region, characterized by a sufficiently large Fisher information and correspondingly small bound variance. This property allows for the derived lower bound to be used as a yardstick to gauge the accuracy of proposed estimators.

Additionally, as demonstrated in more detail below, derived expressions for the Fisher information of various signal model parameters often provide useful insights into problem geometry and characterization as well as estimator design.

Time of Arrival, Polarization Estimate Variance Bounds

While we could use the information inequality to derive a bound on location estimate variance directly from the adopted signal model, it is instructive to consider estimating the source position ξ by first estimating geophone ranges r and arrival directions φ from the measured geophone signals G(ω). Intermediately estimating these parameters from a set of observations is analogous to the common practices of estimating P-wave and S-wave times of arrival and particle polarizations, or angles of incidence. Examining the signal and noise properties which affect the accuracies of these intermediate parameter estimates will provide expressions with which to compare parameter estimation accuracies often cited in the literature, and will provide insight into commonly used error metrics such as root-mean-square, or RMS, time of arrival residuals. After examining these dependencies on signal and noise properties, we will examine how these intermediate parameters each play a role in source localization accuracy in more detail below.

A. Bound Derivations

Although we seek to estimate r and φ, the full set of unknown parameters θ that we must estimate from the set of observations G(ω) includes the unknown pulse transform ψ(ω), giving $$\theta = [r^\tau \; \varphi^\tau \; \psi(\omega)]^\tau \quad (19)$$

We presently assume all other signal model parameters such as wave propagation speeds are known.

While solving for the full Fisher information matrix $J_\theta$ through the application of (18) yields a 3×3 block matrix, presently only the matrix blocks corresponding to the source range and angle parameters are of interest. Omitting some algebra, and assuming that the P-wave and S-wave pulses are uncorrelated (as would be the case if the pulses did not overlap in time), we find that the Fisher information is diagonal, $$J_{r,\varphi} = \begin{bmatrix} ESNR \cdot I & 0 \\ 0 & SNR \cdot I \end{bmatrix} \quad (20)$$

where we have the ESNR, or "effective signal-to-noise ratio", which measures an effective ratio of the total energy in the signal derivative to that in the noise, $$ESNR = \frac{DSNR_p}{v_p^2} + \frac{DSNR_s}{v_s^2} \quad (21)$$

defined in terms of P-wave and S-wave DSNRs, or "derivative signal-to-noise ratios", $$DSNR_p = \sum_{\omega=0}^{T-1} \frac{\omega^2 \alpha_p^2 \cdot \psi^2(\omega/v_p)}{\sigma_n^2(\omega)} \quad (22)$$

$$DSNR_s = \sum_{\omega=0}^{T-1} \frac{\omega^2 \alpha_s^2 \cdot \psi^2(\omega/v_s)}{\sigma_n^2(\omega)} \quad (23)$$

and the SNR, $$SNR = \sum_{\omega=0}^{T-1} \alpha_p^2 \cdot \frac{\psi^2(\omega/v_p)}{\sigma_n^2(\omega)} + \sum_{\omega=0}^{T-1} \alpha_s^2 \cdot \frac{\psi^2(\omega/v_s)}{\sigma_n^2(\omega)} \quad (24)$$

which is the sum of the P-wave and S-wave signal-to-noise ratios.

Accordingly, estimates of source distance and angle have variances bounded below by their respective information inverses;

$$Var\{\hat{r}\} \geq J_r^{-1} = \frac{1}{ESNR} \cdot I \quad (25)$$

$$Var\{\hat{\varphi}\} \geq J_\varphi^{-1} = \frac{1}{SNR} \cdot I. \quad (26)$$

The fact that $J_{r,\varphi}$ is diagonal for uncorrelated P and S-wave pulses implies that source range and angle of incidence can be independently estimated for such pulses. If the two pulses do overlap in time and are somewhat correlated, small off-diagonal terms appear in $J_{r,\varphi}$, reflecting the fact that the estimation of these parameters becomes intertwined to some degree. Such secondary terms have interpretations along the lines of those given by the dominant diagonal terms, and will be neglected in the present discussion. Additionally, it is of interest to note that the variance bounds placed on $\hat{r}$ and $\hat{\varphi}$ in (25) and (26) both take the form of diagonal matrices, indicating that under our current model and assumptions, distance and angle estimates can be made independently sensor to sensor. If the P-wave and S-wave arrivals are instead correlated to some degree, weak off-diagonal terms will also appear in the bound for source distance estimates, indicating that optimal source distance estimates for each sensor will require considering the observations at other sensors as well.

Although errors in estimates of source distances can be associated with time of arrival estimation error, the bound presented in (25) was derived for estimates of distance which take into account the full observations G(ω). In contrast, it is typical practice to analyze P-wave and S-wave arrival times separately through automated techniques or manual "picking" based on prominent peaks in the observed data, rather than through the use of an estimator which takes the entire observed waveform into account. Although the distinction between these two methods may be subtle, they represent different ways of estimating source distance, and thus source location.

Defining the time of arrival parameters $\tau_p$ and $\tau_s$ to be M×1 column vectors representing the P-wave and S-wave arrival times at the M sensors, $$\tau_p = \frac{r}{v_p}, \; \tau_s = \frac{r}{v_s} \quad (27)$$

we can again apply (18) with $\tau_p$ and $\tau_s$ as unknown parameters rather than r to find the following bounds for separately estimated P-wave and S-wave arrival times:

$$Var\{\hat{\tau}_p\} \geq \frac{1}{DSNR_p} \cdot I \quad (28)$$

$$Var\{\hat{\tau}_s\} \geq \frac{1}{DSNR_s} \cdot I \quad (29)$$

assuming uncorrelated P-wave and S-wave waveforms as before.

We can now observe that both time of arrival estimates and direct distance estimates depend on the P-wave and S-wave DSNRs. It makes sense intuitively that this should be the case; the energy in the derivative of a signal relates to how rapidly the shape of the signal fluctuates over time, corresponding to sharp features that allow for better estimation of signal feature occurrence times. Alternatively, the expressions for DSNR, (22) and (23), can be viewed as weighted sums of the energy in the signals, where higher frequencies are given more weight than lower frequencies by the increasing term $\omega^2$, reflecting the common intuition that a signal with energy concentrated at higher frequencies will provide better time localization. In contrast, angle of arrival estimation accuracy depends on total SNR because the relative amplitudes of the arriving waveform at the vertical and horizontal sensors are used in estimation, resulting in no preference for content of a particular frequency.

B. Comments on Time of Arrival Residuals

It is a common practice in current microseismic analysis to study time of arrival estimation accuracy in terms of the differences between a hypothesized set of arrival times, as found through forward modeling of wave propagation, and a set of arrival times estimated from observations, often referring to the standard deviation or RMS value of the full set of P-wave and S-wave arrival time errors. The expressions given in (28) and (29) for P-wave and S-wave time of arrival estimate variances provide some interesting observations which lead to potentially new insights regarding the use of these common error metrics.

Given our current model of a P-wave and S-wave which derive from a common pulse shape $\psi(\omega)$ stretched by their corresponding wave propagation speeds, and referring to the definitions of the two DSNRs given in (22) and (23), it can be shown that for adequately sampled data, $$DSNR_s = \frac{\alpha_s^2 v_s^2}{\alpha_p^2 v_p^2} \cdot DSNR_p \tag{30}$$

in the presence of white noise, and $$DSNR_s = \frac{\alpha_s^2 v_s^3}{\alpha_p^2 v_p^3} \cdot DSNR_p \tag{31}$$

in the presence of 1/f noise, with typical velocity geophone data falling somewhere between these two cases. These relations reflect the fact that the S-wave contains energy shifted lower in frequency than the P-wave by a factor of $v_s/v_p$, thus yielding a lower DSNR for equal amplitudes ($\alpha_s = \alpha_p$). Because the lower bounds on estimation accuracy for P-wave and S-wave arrival times are each proportional to their respective DSNRs, these expressions establish approximate relationships that can be used to assess the relative accuracy with which P-wave and S-wave arrival times can be estimated for a particular event, given measurements of propagation velocities and waveform amplitudes. While a more exact relationship could be derived for arbitrary noise environments, $\sigma_n(\omega)$, these approximate relationships are sufficient for our present discussion.

We can see in (30) and (31) that unless the amplitude ratio, $\alpha_s/\alpha_p$, equals a particular value dictated by the velocity ratio, $v_s/v_p$, and noise spectrum, $\sigma_n(\omega)$, the two DSNRs will be unequal, resulting in different time of arrival estimation accuracies for the P-wave and S-wave of a given microseismic event. Because this amplitude ratio depends on the radiation pattern of the microseismic event and is independent from the noise environment, we should expect that in general P-wave time of arrival estimates and S-wave time of arrival estimates will be made with different accuracies for observations of any particular microseismic event. One implication of this is that specifying the time of arrival accuracies implicitly makes an inaccurate statement regarding the P-wave and S-wave relative amplitudes and background noise spectrum. For example, the commonly performed simulation of applying perturbations to arrival times with a single standard deviation for both P-wave arrival times and S-wave arrival times implicitly assumes that the relation $\alpha_s/\alpha_p = v_p/v_s$ holds for all observations if a white noise background is present or that $\alpha_s/\alpha_p = (v_p/v_s)^{1.5}$ holds if a 1/f noise environment is present.

In addition to the fact that we should expect to achieve different estimation accuracies for P-wave and S-wave times of arrival, we can separately observe that for a given time of arrival estimation error, the amount of resulting source distance estimation error depends on the associated wave propagation velocity, $$\epsilon_r = \epsilon_T v \tag{32}$$

where $\epsilon_r$ is the resulting distance error, $\epsilon_T$ is the time of arrival estimate error, and $v$ is the associated propagation velocity. Because we typically care about time of arrival estimation accuracy only in relation to the source location estimates which follow, it is undesirable that specifying time of arrival estimation accuracy without an associated propagation velocity leaves the resulting localization accuracy ambiguous.

As an aside, it should be noted that for a particular amount of time of arrival estimation error common to both P-waves and S-waves, the variance of the S-wave arrival time estimates will correspond to a source distance estimation variance which is a factor $v_s^2/v_p^2$ less than the P-wave arrival time errors, partially offsetting the observation given in (30) and (31) that we will perform less accurate time of arrival estimates for S-waves than P-waves of the same amplitude. In fact, when combined with the typically higher amplitudes observed for shear waves, this may result in S-wave time of arrival estimates actually yielding better source localization accuracy than P-wave time of arrival estimates for typical noise environments.

These considerations of the relationships between time of arrival estimation accuracy, P-wave and S-wave amplitudes and propagation velocities, noise environments, and corresponding source localization errors demonstrate the ambiguities inherent in the specification of an overall RMS time of arrival residual. Because we should not expect to achieve the same P-wave and S-wave time of arrival estimation accuracies for any particular observed microseismic event, we suggest that P-wave and S-wave arrival time residuals be reported separately (as is often done in earthquake localization analysis), and perhaps in relation to the lower bounds given in (28) and (29), when examining time of arrival estimation accuracy. Otherwise, we suggest that corresponding distance errors be reported rather than time of arrival errors when source localization accuracy is of interest. While these distinctions may seem subtle, they lead to an important result regarding optimally estimating microseismic event location from a set of estimated P-wave and S-wave times of arrival that will be presented in more detail below.

Location Estimate Variance Bounds

Having derived and examined bounds for the accuracy of estimates of source distance and angle of arrival, we now derive a bound for the accuracy of estimates of source location. In interpreting this bound, we will leverage the understanding we have developed thus far of how signal and noise properties affect estimates of range and angle of arrival by examining how each of these parameters factor into location estimation accuracy geometrically. The end results of this discussion are analytic formulas expressing the uncertainty present in microseismic source localization and an intuitive understanding of the contributing factors and geometry involved. We then briefly discuss straightforward extensions of these intuitions, compare the presented results to previously observed and simulated location uncertainty phenomena, and discuss the implications of these results on optimal source location estimation techniques and geophone array design.

A. Bound Derivation

Because the previously studied ranges and arrival angles contain all position information embodied in the geophone signals, we can compute the Fisher information matrix for source location $\xi$ in terms of the intermediate parameter Fisher information as $$J_\xi = \frac{\partial \theta^\tau}{\partial \xi} J_\theta \frac{\partial \theta}{\partial \xi^\tau} \quad (33)$$

The bound on location estimate variance is then, $$\text{Var}\{\hat{\xi}\} \geq \left(\frac{\partial \theta^\tau}{\partial \xi} J_\theta \frac{\partial \theta}{\partial \xi^\tau}\right)^{-1} \quad (34)$$

In order to compute this bound, we need the sensitivity of our parameters $\theta$ to source location $\xi$. As before, our parameters $\theta$ are given by $$\theta = [r^\tau \ \varphi^\tau \ \psi(\omega)]^\tau$$

and performing the necessary differentiation yields $$\frac{\partial \theta^\tau}{\partial \xi} = [B^\tau \ B^{\perp \tau} \text{diag}\{r\}^{-1} \ 0] \quad (35)$$

where B and $B^\perp$ are the composite direction cosine matrices (3) and (5). Carrying out the matrix multiplication specified by (34), we have $$\text{Var}\{\hat{\xi}\} \geq (B^\tau J_r B + B^{\perp \tau} \text{diag}\{r\}^{-1} J_\varphi \text{diag}\{r\}^{-1} B^\perp)^{-1} \quad (36)$$

where $J_r$ and $J_\varphi$ represent the inverses of the range and angle bound variances as given in (25) and (26). If we then substitute for these parameter Fisher informations, we arrive at the following lower bound for location estimate variance, $$\text{Var}\{\hat{\xi}\} \geq (\text{ESNR } B^\tau B + \text{SNR } B^{\perp \tau} \text{diag}\{r\}^{-2} B^\perp)^{-1} \quad (37)$$

While (37) presents the bound on location estimate variance directly in terms of signal and noise properties, (36) presents the bound in a form which connects it to our previous discussion of intermediate parameter estimation accuracy. The expression states that the variance of location estimates is bounded below by the inverse of the sum of information contributions from the intermediate parameters, r and $\varphi$, each modified by geometric factors. We will now discuss the interpretation of these factors, yielding simple intuitions for the geometric connections between the previously discussed intermediate parameters and resulting source location estimation accuracy.

B. Geometric Interpretation

Because source location exists in a three-dimensional space (reduced to a two-dimensional space for our present analysis), the bound provided by the information inequality on location estimate variance contains geometric information, quantifying the expected spatial distribution of estimation errors. In fact, the bound given in (36) and (37) represents a bound on the covariance matrix of the probability distribution of our location estimate errors, which for an efficient estimator of source location will be Gaussian. Because of this, we can use the bound to derive confidence ellipsoids (simply ellipses in the two-dimensional case) around a particular source location, displaying the region within which we expect a particular percentage of efficient location estimates to fall. Such ellipsoids provide an easily interpretable analytic measure of the accuracy with which one can hope to localize events, and developing an intuition for the geometric considerations which give rise to these error ellipsoids is of value.

As given in (15), there is an inverse relationship between the Fisher information for a parameter and the resulting estimation variance bound. In terms of estimating multidimensional quantities such as location, we can interpret Fisher information as being provided in a particular direction by examining the amount of information contributed to each dimension of the estimated quantity. Having a large amount of information in some direction then makes the location estimate variance along that direction accordingly small. In this way, we can develop an intuition for the size and orientation of location error ellipsoids by examining the information contributions from distance and angle of arrival estimates in terms of their magnitudes and directions. We will see that these are given quite readily by the signal and noise properties discussed above and simple interpretations of source-array geometry.

The source location information contributed by estimates of source-receiver distance appears in (36) as $$B^\tau J_r B \quad (38)$$

We have previously observed that $J_r$ is diagonal under our assumption of uncorrelated P-wave and S-wave pulses. Denoting by $1/\sigma_{r,m}^2$ the mth diagonal element of $J_r$, we can write (38) as $$\sum_{m=1}^{M} \frac{1}{\sigma_{r,m}^2} \cdot \beta_m \beta_m^\tau \quad (39)$$

which reveals that the information provided by a set of distance estimates is a sum of contributions from each individual distance estimate, where each estimate contributes an amount of information given by the inverse of its variance with a spatial distribution given by the outer product of its associated source-geophone direction cosine vector, $\beta_m$. This result gives that the information provided by a range estimate is oriented in the direction from source to receiving sensor, an orientation which is intuitively appealing because a change in source location along this direction will provide the greatest change in observed signal arrival time. Note that for the case analyzed above, $1/\sigma_{r,m}^2$ would be equal to a common ESNR for all M sensors.

We can use this information orientation result to develop intuition regarding the effects of array aperture and density on localization accuracy: If the span of a geophone array is wide in relation to a particular location, the unit vectors $\beta_1, \ldots, \beta_M$ will be spread in their orientations, and thus provide information which is fairly well distributed in direction. At a location for which the array aperture is small (due to being further from the array, for example), the $\beta$ vectors will all tend to point in one dominant direction toward the array, providing almost all of their location information along that dimension alone. In this way, the source-sensor direction vectors dictate the spatial distribution of the information provided by a particular number of sensors, while the total amount of provided information remains the same if we assume that the sensors maintain the same observed ESNRs regardless of placement. The fundamental effect of array density, or number of sensors, for a given array aperture can then be interpreted as providing more total information with essentially the same directional distribution, decreasing the size of an associated error ellipse roughly by the inverse of the sensor count while approximately maintaining its shape. It should be pointed out that as the density of sensors increases, the sensor noise will become correlated from sensor-to-sensor, and the effective number of 'independent' sensors will be less than the actual number. As an aside, although it is not realistically achievable for a wide range of source locations at once, it can be shown that for a given amount of observed information a perfectly equal directional distribution, thus giving spherical error ellipsoids, yields the smallest RMS location error about a potential source location.

Figure 2:
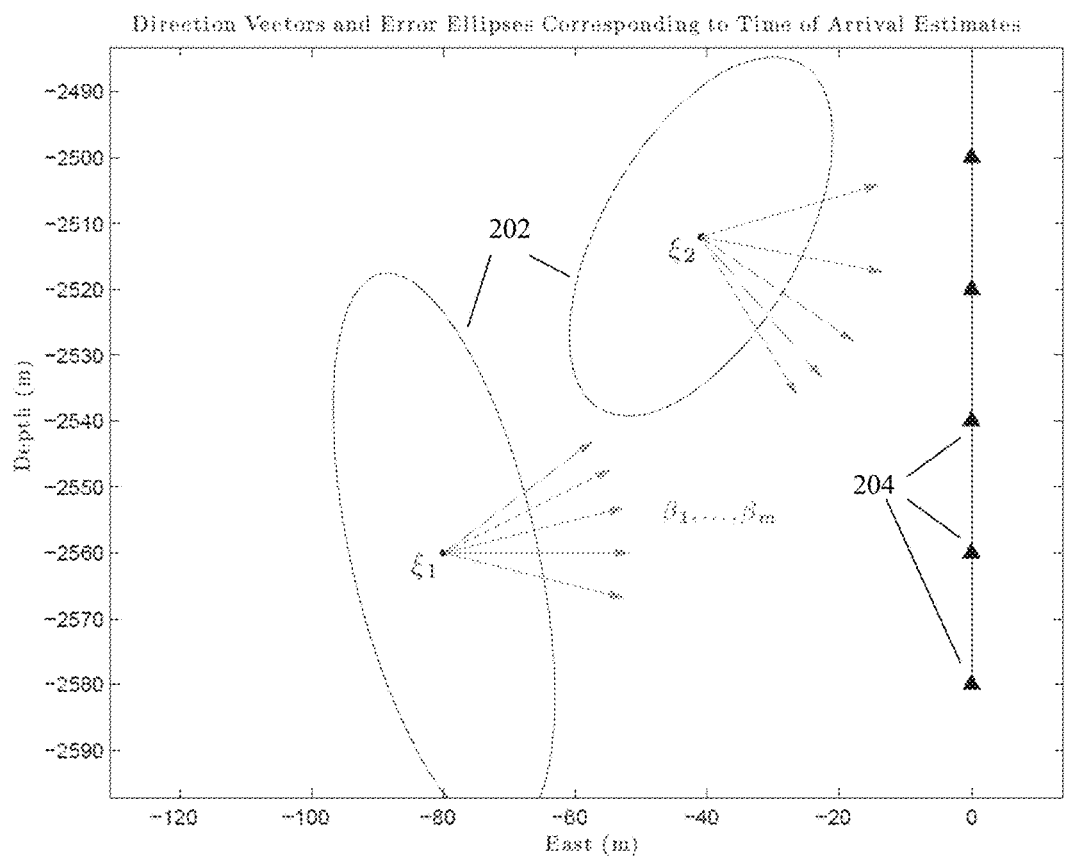
FIG. 2 illustrates the geometric computation of example position estimate error ellipses based on time of arrival estimates according to embodiments of the invention.

FIG. 2 illustrates how location information $\xi_1$ and $\xi_2$ derived from time of arrival estimates is provided along the direction of the source-to-receiver vectors, $\beta_m$, $m=1, \ldots, M$, resulting in location estimate error ellipses 202 which are narrow in those dimensions. The amount of location information provided by each sensor 204 is insensitive to the distance between the source and that sensor, for a given observed ESNR, although observed ESNR will tend to decrease with distance due to propagation losses.

Figure 3:
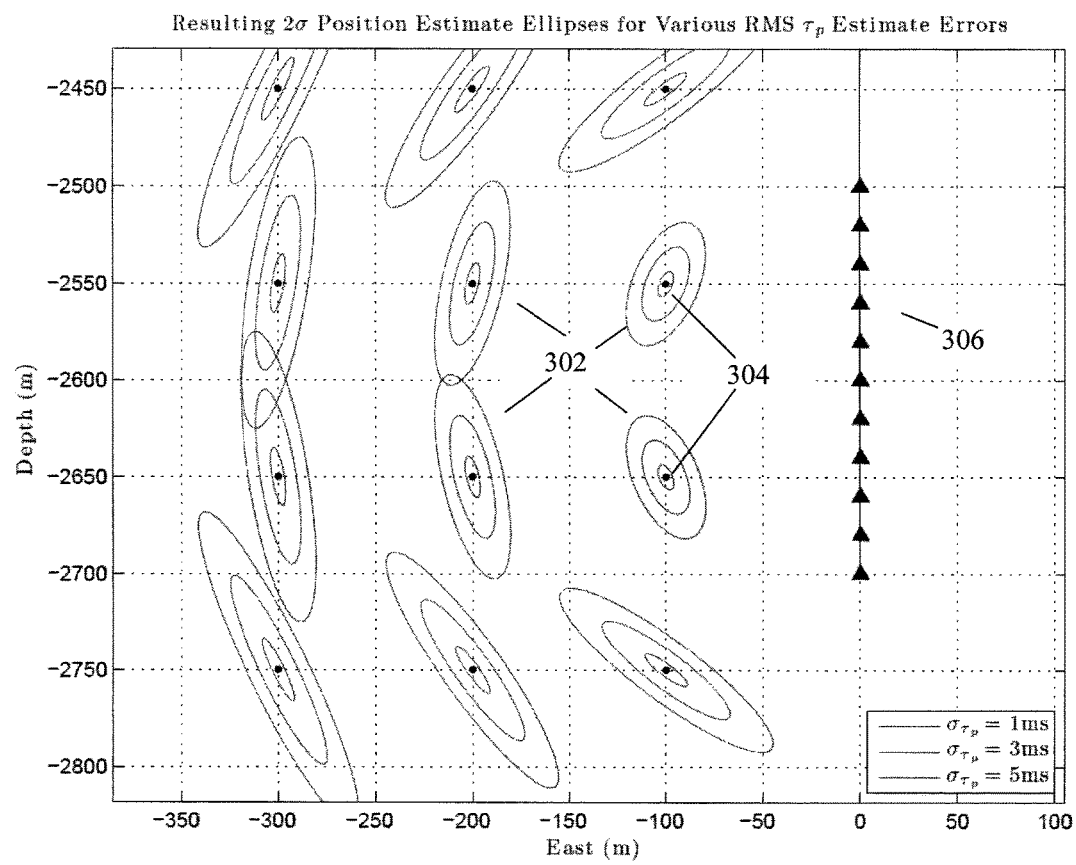
FIG. 3 illustrates how example position estimate error ellipses based on time of arrival estimates will vary based on source position and ESNR (Effective Signal-to-Noise Ratio) according to embodiments of the invention.

FIG. 3 illustrates that, for a given ESNR, and thus corresponding time of arrival estimate variances, error ellipses 302 grow in the direction perpendicular to the average source-to-array direction for sources that are further away due to smaller array aperture, while errors in the average source-to-array direction actually improve slightly. For decreasing ESNR, ellipses grow proportionately in all directions. Velocities of $v_p=5000$ m/s and $v_s=3000$ m/s were used in generating the example shown in FIG. 3.

It is of interest to note that the variance of distance-based source location estimates, and thus the size of the associated location error ellipse, is dependent upon the ESNRs observed at each sensor but is not geometrically dependent upon the source-sensor distances, $r_m$. The only geometric cause of increased location estimation error with increasing range is thus the decreasing aperture angle, and so the increase in error with distance for a constant ESNR observed at the sensor array occurs mainly in the direction perpendicular to the mean array 306 direction. In fact, estimation accuracy in the mean array direction would show a corresponding slight improvement if ESNR remained constant; however, in reality decreased ESNR due to additional propagation and spreading loss will increase error in all directions as source-array distance increases. Additionally, because the provided information becomes more concentrated in one direction, the resulting RMS location error would increase with distance even if observed ESNRs remained constant and thus the same amount of information was provided. An illustration of the $2\sigma$ error ellipses 302 for various P-wave time of arrival estimate standard deviations is presented in FIG. 3. These ellipses represent the area within which two standard deviations, or approximately 95%, of efficiently estimated locations would be placed for a source 304 occurring at the central point, given P-wave time of arrival estimates with the stated standard deviations. Each time of arrival estimate accuracy corresponds to a particular ESNR, and thus the dependencies just discussed may be observed.

The information contributed to location estimates by angle of arrival estimates appears in (36) as $$B^{\perp\top}\text{diag}\{r\}^{-1}J_\varphi\text{diag}\{r\}^{-1}B^\perp \qquad (40)$$

Again appealing to the assumption that the P-wave and S-wave pulses are uncorrelated, we have that efficient estimates of angles of arrival can be made independently sensor-to-sensor and $J_\varphi$ is diagonal. As such, we can write (40) as $$\sum_{m=1}^{M} \frac{1}{\sigma_{\varphi,m}^2 \cdot r_m^2} \cdot \beta_m^\perp \beta_m^{\perp\top} \qquad (41)$$

where $\sigma_{\varphi,m}^2$ is the angle estimate error variance. This expression is very similar to that given for contributions to location estimates from time of arrival estimates in (39), and an analogous interpretation results. Here we have that the information provided by a set of arrival angle estimates is the sum of contributions from each individual arrival estimate, where the mth sensor contributes an amount of information proportional to its Fisher information and according to the direction perpendicular to the corresponding source-sensor direction, as denoted by $\beta_m^\perp$. The fact that the information provided by an arrival angle estimate is oriented in the direction perpendicular to the source-sensor direction is intuitively appealing because moving perpendicular to the source-sensor direction results in the greatest change in observed angle. Note that for the case analyzed above, $\sigma_{\varphi,m}^2$ would be equal to a common SNR for all M sensors.

Figure 4:
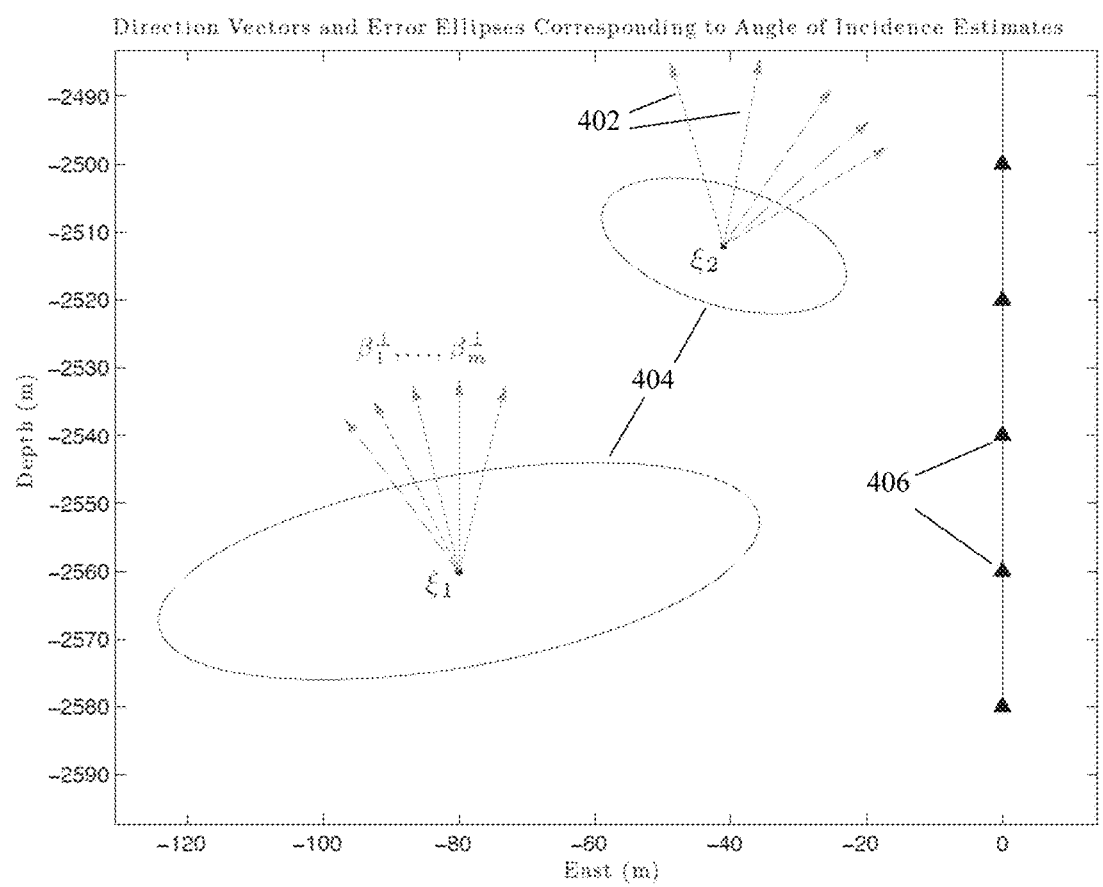
FIG. 4 illustrates the geometric computation of example position estimate error ellipses based on angle of incidence estimates according to embodiments of the invention.

FIG. 4 illustrates how location information derived from angle of incidence estimates is provided along the direction perpendicular to the source-to-receiver vectors 402, $\beta_m^\perp$, $m=1, \ldots, M$, resulting in location estimate error ellipses 404 which are narrow in those dimensions. The amount of location information provided by each sensor 406 is inversely proportional to the square distance between the source and that sensor for a given observed SNR, causing large increases in error for sources far from the sensor array.

Because the form of the information contributions given in (41) is essentially the same as that given in (39) for range based estimates, the discussion given before regarding array aperture and density applies here exactly analogously, except that all information is oriented in the set of perpendicular directions. However, in contrast to location estimates based on time of arrival estimates, location estimation error resulting from arrival angle estimates increases with distance due to geometric factors, as given by the term in (41). Unlike the increase in error from decreased array aperture, which also occurs, this distance factor corresponds to an increase in error in all directions. When combined with decreased SNRs for events of the same amplitude but occurring at greater distance due to propagation and spreading loss, this geometric factor means that location estimates based on a collection of angles of arrival can become highly inaccurate at large distances. An illustration of the 2σ error ellipses for various angle of arrival estimate standard deviations is presented in FIG. 5, demonstrating that angle of arrival can provide decent location estimates when the event is close to the sensor array and a large aperture is present, but that location estimate variance becomes large at further distances, becoming quite extreme in the range, or mean source-to-array, direction.

Figure 5:
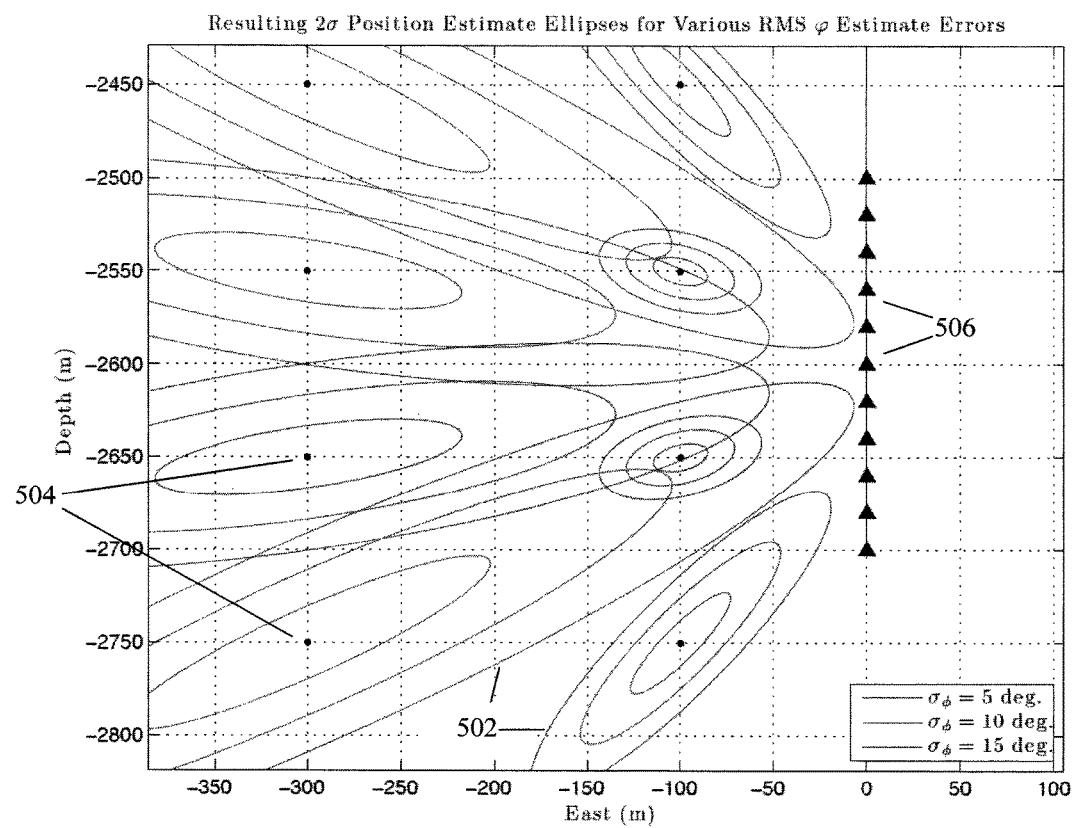
FIG. 5 illustrates how example error ellipses based on angle of incidence estimates will vary based on source position and ESNR according to embodiments of the invention.

More particularly, FIG. 5 illustrates that for a given SNR, and thus corresponding angle of arrival estimate variance, error ellipses 502 grow in all directions for sources 504 that are further from the array 506 due to geometric factors, with errors increasing more in the mean source-to-array direction. For decreasing SNR, ellipses grow proportionately in all directions. Velocities of $v_p$=5000 m/s and $v_s$=3000 m/s were used in generating this example.

The interpretation discussed here of directional information being provided by each sensor yields a simple graphical method for estimating the size and orientation of error ellipses: Mark a potential source location and set of sensors on a page and draw a unit-radius circle around that source point. For distance-based source location estimates, draw a vector from the source location to the circle in the direction of each geophone (effectively drawing the unit vectors $\beta_1, \ldots, \beta_M$), and place point masses on the ends of each unit vector with a weighting proportional to the associated geophone's ESNR. For angle-based estimates, draw these vectors in the directions perpendicular to the corresponding source-geophone directions, and give the associated point masses weightings according to the geophones' SNRs divided by their square source-sensor distances instead. Then, along any given line passing through the source, the Fisher information is equal to the second moment about the source position of the geophone "masses" projected orthogonally onto that line. The resulting error ellipse is centered on the source, and has major and minor axes given by the inverses of the largest and smallest moments of the constructed mass arrangements.

Figure 6:
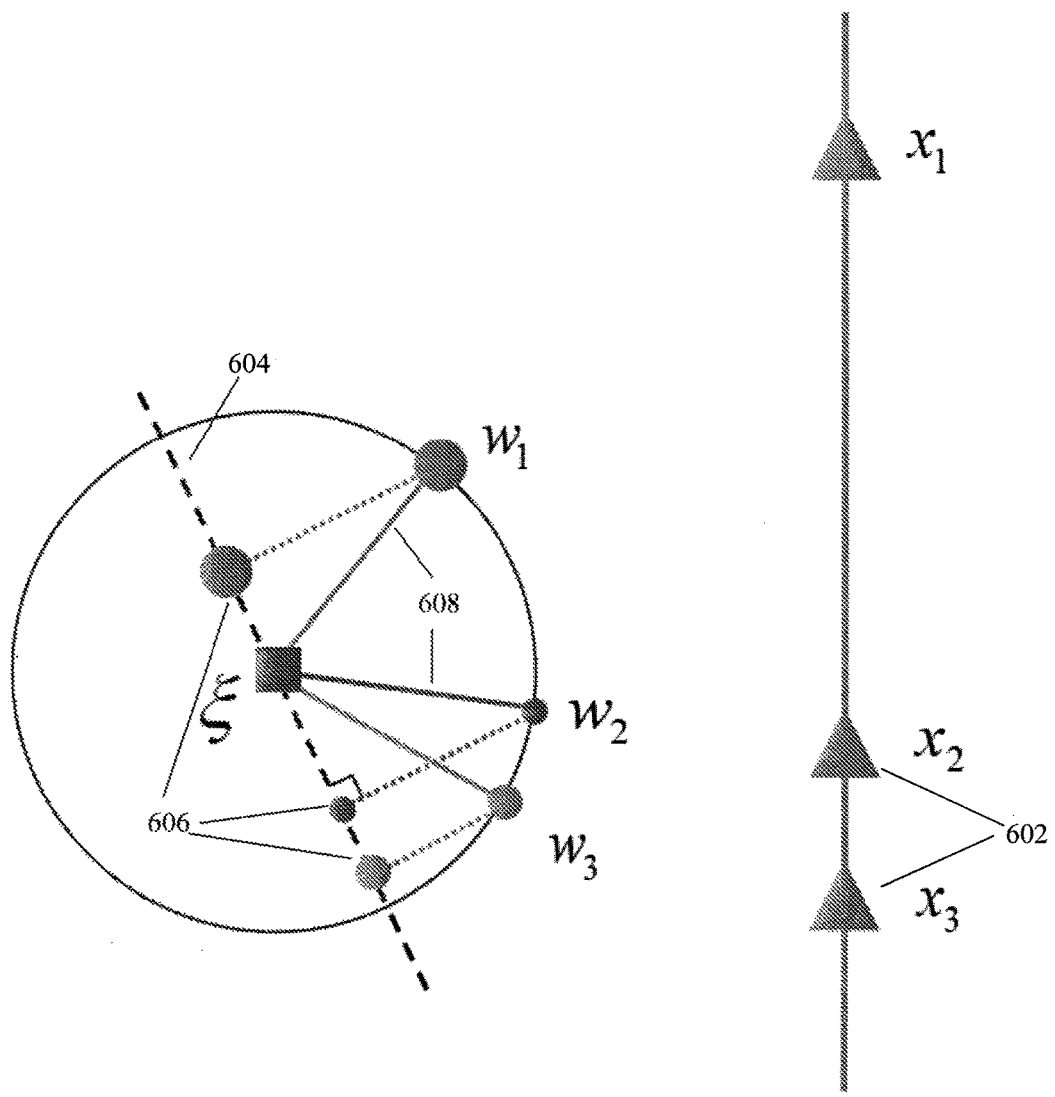
FIG. 6 illustrates an example graphical method for finding position information contained in source-sensor measurements according to embodiments of the invention.

FIG. 6 illustrates the graphical method for finding error ellipse orientation, given a potential source location ξ and set of geophones 602. A direction is chosen along which to evaluate expected error (dotted line 604) and appropriately weighted masses 606 are projected onto it from the ends of the unit vectors 608 $\beta_1, \ldots, \beta_M$. The second moment of these projected weights about the potential source location is then calculated, giving the amount of information provided by the sensor array in the chosen direction.

Having examined the geometry relating our previously analyzed distance and angle of arrival estimates to source location estimates separately, we will now discuss estimation of source location using the complete signal observations G(ω), that is, using both our estimates of range and angle of arrival. As mentioned previously, we can see in (36) that the total information present regarding the source location of an observed microseismic event is given by the sum of distance and arrival angle informations, each modified through their respective geometric factors. Because these terms, as given in (38) and (40), are each positive definite, they will both always contribute information to $J_\xi$, meaning that within the region of operation where these models and derivations hold there are no conditions under which estimating source location through the use of just estimated distance or angle of arrival is more accurate than using both together, appropriately weighted. Therefore, we should always attempt to estimate both parameters and take the source location information they provide into account with a weighting given by the amount of confidence we have in our estimates.

Figure 7:
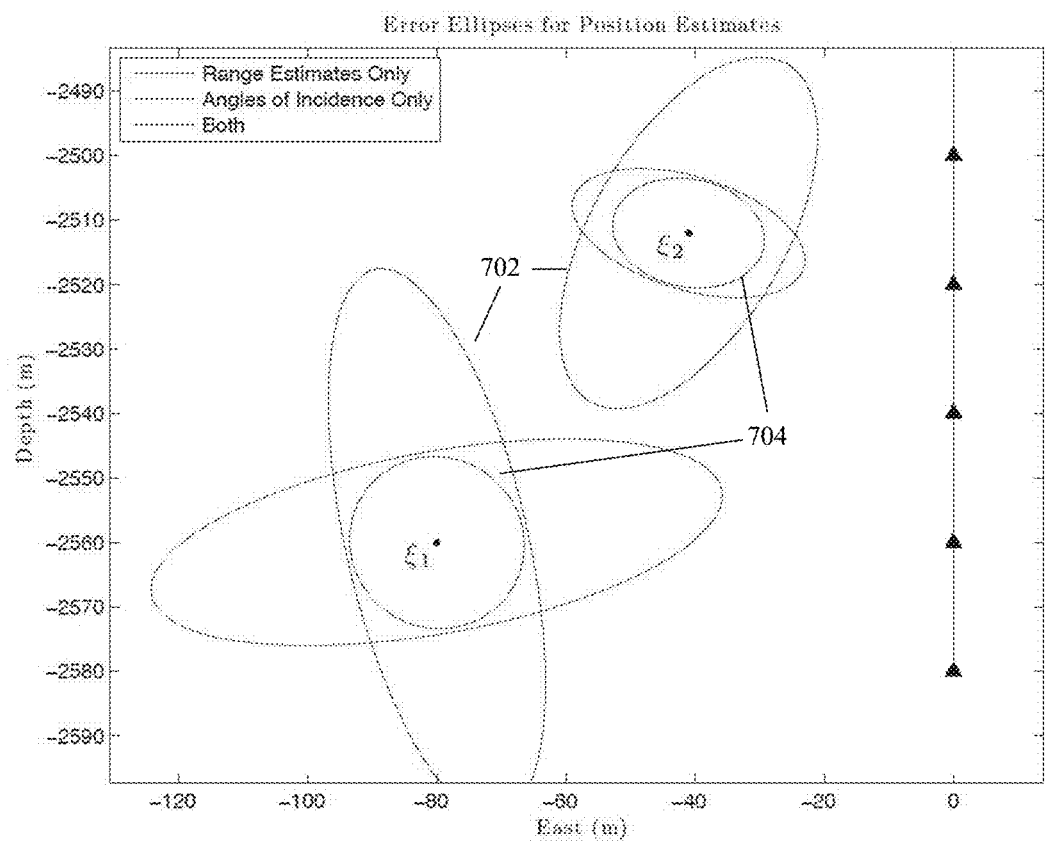
FIG. 7 illustrates example error ellipses based on a combination of time of arrival estimates and angle of incidence estimates according to embodiments of the invention.

The additive property of distance and angle information is especially beneficial because of the fact that the two parameters provide information in orthogonal directions, β and $\beta^\perp$, meaning that the sum of their informations provides a much more circular error ellipse than the use of either alone. Because of this, information provided by angle of arrival estimates can still prove useful at reasonable distances, despite their rapidly decreasing contributions, by helping in the estimation of the source location dimension least constrained by distance information. Illustrations of how the two previously discussed parameter informations, $J_r$ and $J_\varphi$, combine to provide more directionally balanced and entirely improved source location estimates are provided in FIG. 7, where the error ellipses 702 corresponding to location estimates based on just distance or angle estimates are plotted along with the error ellipses 704 resulting from their combined use, and in FIG. 8, where the 2σ error ellipses resulting from the combination of the cases depicted in FIG. 3 and FIG. 5 for three levels of parameter estimation accuracy are displayed. It is worth comparing FIG. 8 to FIG. 3 to note the contribution of arrival angle estimates to source location estimate accuracy in the $\beta_\perp$ direction, even at larger distances.

As an extension of the discussion presented here regarding the contributions of parameter estimates to source localization accuracy, we now present a brief discussion regarding the somewhat fundamentally different geometry which results when only either P-wave or S-wave arrival times are available for a set of sensors rather than both, as examined previously. This case will be of interest when we consider previous studies of surface array source localization accuracy, where it is often the case that only P-wave arrivals can be observed. Note, however, that if even a single pair of P-wave and S-wave arrivals can be found on a common sensor, the analysis and interpretation presented previously will apply rather than the case to be discussed here, with arrivals that cannot be marked due to differing noise levels or sensor failure simply not contributing any information.

In the case that only P-wave or S-wave arrivals can be estimated, the source-sensor distances can be measured only to within a constant offset, $r_0$, common to all geophones as $$\tilde{r} = r + 1 \cdot r_0 \qquad (42)$$

Thus, in estimating position from these offset distances $\tilde{r}$ the unknown parameter $r_0$ must also be estimated. It can be shown that in this case the M−1 differences in range between the first and other geophones, $$\delta = [-1 \; I]\tilde{r} \qquad (43)$$

contain all position information present in the measurements $\tilde{r}$, effectively giving up one dimension of the measurements to identify the offset $r_0$, and leaving only the components of $\tilde{r}$ orthogonal to 1 available to estimate position. In this case, the arrival time component of the position Fisher information is $$\text{ESNR } B^\tau P_1^\perp B \qquad (44)$$

as compared to (38), where $P_1^\perp = I - 11^\tau/M$ represents a projection orthogonal to the column of ones, 1.

Figure 9:
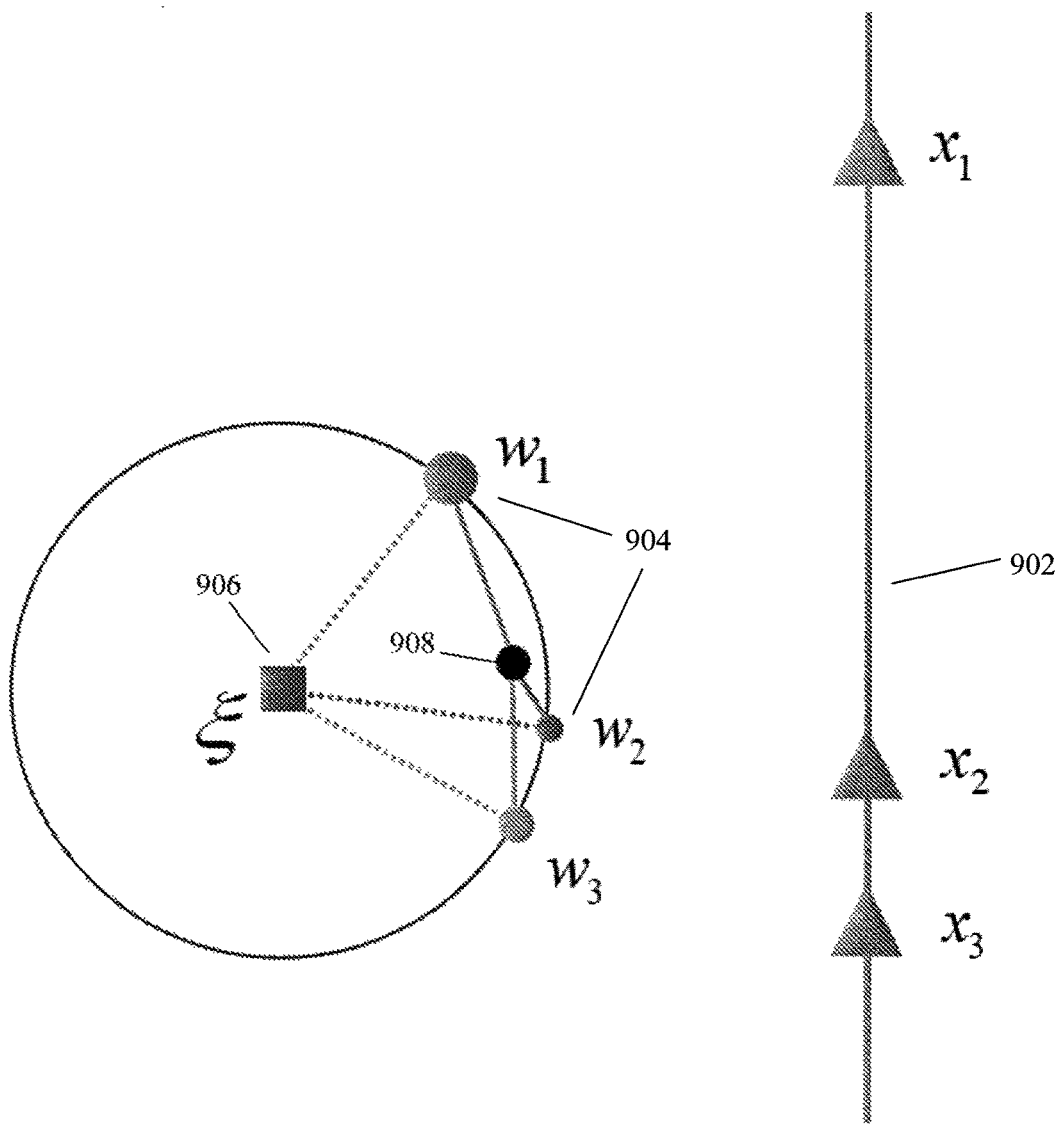
FIG. 9 illustrates an alternative graphical method for finding the position information in time of arrival difference measurements according to embodiments of the invention.

While range measurements led to a graphical interpretation of the Fisher information based on the second moment of weighted source-geophone direction cosines about the source location, as depicted in FIG. 6, in the present case of range differences the Fisher information may be viewed as the second moment about the mean of the same weighted direction cosines, as illustrated in FIG. 9. The result is that if there is a dominant, average direction in the information provided by the time of arrival estimates, the information provided along that direction will be substantially decreased if only P-wave or S-wave arrivals, and thus range differences, are available, as compared to the case when both arrivals, and thus complete ranges, are available. In contrast, the information provided in directions perpendicular to a dominant source array 902 direction will be largely the same for both cases, because the projected distances of the weights onto a line oriented in such a perpendicular direction will be about the same whether it passes through the origin or mean weighted location.

More particularly, FIG. 9 provides an illustration of the graphical method for finding distance estimate based location error ellipse orientation when only P-wave or S-wave arrivals can be detected, given a potential source location and set of geophones 902. A direction is chosen along which to evaluate expected error (dotted line) and appropriately weighted masses 904 are projected onto it from the ends of the unit vectors $\beta_1, \ldots, \beta_M$. The second moment of these projected weights about the mean weighted direction is then calculated, giving the amount of information provided by the sensor array in the chosen direction.

Thus, for source locations which are far enough from the array to have small aperture, range differences $\delta$ and ranges r produce similar amounts of information in the $\beta^\perp$ directions, but range differences lose most of the information provided in the $\beta$ direction by range estimates. This causes source location estimates based on range differences to give error ellipses with orientations similar to those resulting from angle of arrival based estimates, with larger errors in the source-sensor direction than the perpendicular direction. Thus, for the case of a surface array which detects only P-wave arrivals, the array will generally provide most of its localization information in the horizontal directions (the $\beta^\perp$ directions), and will have comparably poor resolution in depth (the dominant $\beta$ direction).

C. Comparison to Previous Studies

While the study of microseismic source localization error in terms of error ellipsoids, parameter estimation accuracy, and signal and noise properties is not entirely new, we find that analyzing this problem through application of the information inequality has yielded intuitions and quantifications that have thus far eluded current literature on the topic. Perhaps the main reason behind this is that the methods previously used to study the topic, including simulation, numerical techniques, and analysis of field data, have generally obscured the mechanisms through which location errors occur and the natural coordinates in which to study them. Here, the application of analytic techniques has revealed the nature of microseismic source localization errors and has quantified widely observed relationships between signal and noise properties, signal parameter estimation, geophone array geometry, and localization error. In this section we will illustrate how the results presented here corroborate, explain, and clarify many of the observations recently presented in the literature. In addressing these previous studies, it will occasionally be necessary to extrapolate the results presented here to the top-down, or map view, two-dimensional case, the three-dimensional case and to cases with multiple, laterally homogeneous velocity layers. As stated previously, results in the three-dimensional case simply include the addition of estimation of the azimuthal angle. In this case, information from the relative amplitudes at all three sensors in a 3-axis package will be used in estimation of both azimuthal and inclination angles, thus resulting in expressions for variance bounds on these estimates with slightly different forms from the one presented here for the estimation of inclination angle. Despite this, our previously developed intuition regarding the geometry of source location errors resulting from inclination angle estimates can be readily extended to azimuthal angles as well: Analogous to our interpretation of the inclination angle, estimation of the azimuthal angle will provide information in the horizontal plane of a potential source location, with the associated information ellipse having its major axis oriented orthogonal to the source-sensor direction for vertical linear arrays, and in general, orthogonal to the distance-weighted, average source-sensor azimuthal direction for arbitrary arrays. Such an orientation results in source location estimation error ellipses contained in the horizontal plane of the source location which are generally long in the source-sensor direction and narrow in the orthogonal direction, with the exact shape being affected by the source-sensor depth relation. When examining the effects of azimuthal angle uncertainty on location estimate accuracy in these papers, we will mostly restrict ourselves to the two-dimensional top-down case, in which azimuthal estimate based location errors can be assumed to follow the same relation as inclination angle-based errors in the side-view two-dimensional case except for potential small deviations depending on source-sensor depth relations.

Figure 10:
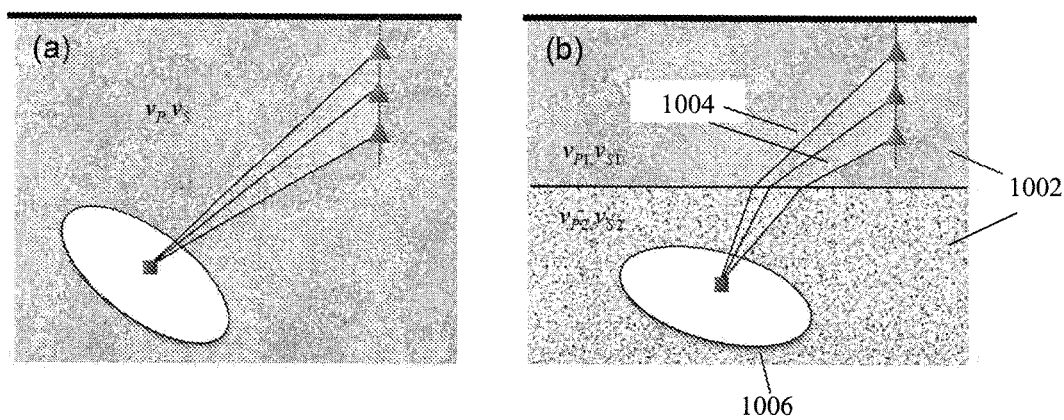
FIGS. 10($a$) and 10($b$) illustrates cases of a single homogenous velocity layer and multiple homogenous velocity layers, respectively.

In order to accommodate multiple laterally homogeneous velocity layers, a simple extension of the previously presented results exists. Because the derivations here are based on local derivatives around a proposed source location, all of our previous definitions, such as for the direction cosine vectors $\beta_1, \ldots, \beta_M$, inclination angles $\varphi$, and distances r, have been defined in terms of source-to-sensor geometry. This construction yields a simple, intuitive interpretation in a layered case: all of the results derived previously for distance related estimations and parameters, such as times of arrival, apply exactly as stated except that these geometric parameters are specified to be as seen locally by the source, with source-to-senor paths being propagated through the velocity layers with appropriate path bending at velocity discontinuities. Similarly, wave propagation speeds, $v_p$ and $v_s$, are to be taken from the values local to the region being analyzed when evaluating the derived bounds. Thus, the effective location and distance of sensors will vary for different potential source positions, possibly in substantial ways for different layers depending on the bending of source-sensor propagation paths. The extension of our previous interpretations regarding inclination angle estimates to multi-layered media follows a similar logic but is complicated slightly by the bending of the ray path at velocity interfaces, requiring a derivation of the relationship between errors in angle estimation at a sensor and the location estimate errors which result when that change in angle is propagated through the layers to the region local to the source location. Thus, a full discussion of this extension will presently be neglected. The source-sensor geometry described here for multilayered media is illustrated in FIG. 10.

As shown in FIG. 10(b), for the case of multiple laterally homogeneous velocity layers 1002, source location estimation accuracy related to range information will be directly analogous to the single layer case shown in FIG. 10(a), but will be dictated by the geometry and velocities as seen by the source. Here, the bending of ray paths 1004 in the deeper layer causes the error ellipse to tilt in orientation toward the location at which it effectively sees the sensor array.

Having discussed the extensions of our derivations to the three-dimensional case or alternate two-dimensional cases, and cases with multiple laterally homogeneous velocity layers, we are now prepared to view previous studies in light of our current results. Here, we will discuss a recent comprehensive treatment of microseismic source localization error by Maxwell, et al., [8], which builds upon a previous examination by Maxwell, [7], as well as a similar pair of publications by Eisner, et al., [6] and [1], which examine location estimate accuracy and in particular compare surface arrays to downhole arrays for microseismic monitoring. We will then discuss a publication by Kidney, et al., [4], which focuses on source localization error as a function of distance from the sensor array, and a paper by Grechka, [5], which begins with a sensitivity analysis similar in spirit to the information inequality used here but uses the SVD (Singular-Value-Decomposition) rather than an a full analytic treatment to explore optimal sensor array placement. All of these papers, having been published in the past two years, represent current approaches to and interpretations of microseismic source localization and its associated uncertainty. We will demonstrate that essentially all observations made in these articles are natural and intuitive under the geometric interpretations we have provided here, and that many qualitative observations are quantified. Commentary on portions of these studies which focus on the effects of velocity model errors on location accuracy will be provided in more detail below.

A fairly comprehensive treatment of microseismic source localization error was recently presented by Maxwell, et al., [8], which builds upon a previous examination by Maxwell in [7]. The dependencies on ESNR and SNR presented above are widely evident in [8]. FIGS. 23 and 24 in [8] contain plots of arrival time and azimuthal uncertainties against SNR which exhibit a 1/SNR characteristic, predicted by (26) and reasonably expected by (28) and (29). Higher SNR events are shown to exhibit less spatial spread in FIG. 17 of [8], as predicted by (37). Additionally, the fact that increasing sensor density linearly increases the amount of information provided by the array and thus correspondingly yields a 1/M decrease in estimation error as discussed previously and quantified by (25) and (26) is demonstrated in FIG. 12 of [8], where plots of azimuthal and depth uncertainties vs. number of geophone levels depict 1/M trends, with depth error benefiting slightly more from the increase in sensor count due to the fact that corresponding increases in array aperture provide additional information in the vertical direction.

Figure 8:
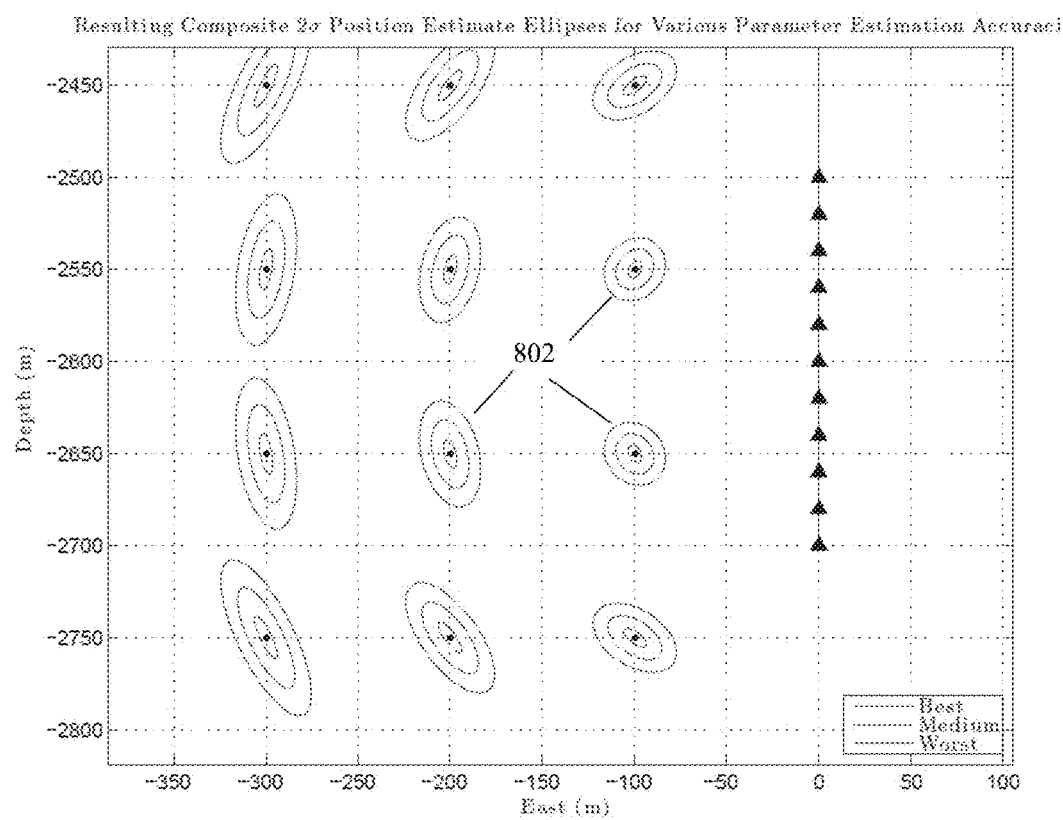
FIG. 8 illustrates how example error ellipses based on a combination of time of arrival estimates and angle of incidence estimates will vary based on source position direction and ESNR according to embodiments of the invention.

In [7], Gaussian perturbations of times of arrival and angles of incidence are applied to synthetically calculated values for a set of source locations within a laterally homogeneous multilayered velocity model, and the resulting location errors can be seen in FIGS. 3 and 8 of [7] to be oriented largely in the direction perpendicular to the mean array direction as seen through the refracting layers, from the source. This agrees with the extension presented previously where the direction cosine vectors, $\beta_m$, are to be defined as seen by the source location in multilayered media. Similar tilting due to velocity differences can be seen in FIG. 6 of [4], where stretching of the ellipses corresponds to differences in local velocity.

A study which is similar to the present one in many ways is given by Eisner, et al., in [6], building on a previous publication, [1]. This pair of publications analyzes the differences in resulting localization error associated with downhole and surface monitoring arrays by calculating the probability densities for source locations associated with independent Gaussian perturbations of time of arrival and azimuthal angle parameters. These probability densities are closely related to the bounds provided here; we have derived the lower bound covariance matrix for Gaussian distributed location errors given our signal model and assumptions, yielding the most densely concentrated probability distribution that can be achieved around a specified true source location by any unbiased location estimator, for specified signal and noise properties and location-array geometry. Because this bound can be achieved by the maximum likelihood estimator when operating in the small error region, small Gaussian perturbations to parameters should result in location estimate variance as given by the bound. Note, however, that inclination angles were not used to provide additional information in these studies, so the results depicted are for range-based estimates only when examined in the correct azimuthal plane.

One observation worth pointing out in regards to the plots in [1] is that in some cases, such as FIG. 2b of [1], the resulting location estimate probabilities plotted in this study have a curvature not captured by the ellipsoidal error bounds presented here. This occurs because the case being analyzed is essentially not within the small-error region. If the parameter uncertainties analyzed were sufficiently small, the curvature of these regions would eventually disappear and they would become ellipsoidal. This phenomenon can be observed in other figures of [1], such as FIGS. 5 and 6, where more sensors are used and the increase in observed information causes the resulting probability densities to become ellipsoidal. Alternatively, if we derived the location estimate error here in terms of spherical coordinates instead of Cartesian coordinates, we would find error bounds which are ellipsoids in spherical coordinates and reproduce the probability density shapes plotted in [1] exactly. In the small-error region, the bounds in these two coordinate systems become equivalent because higher order terms affecting the shapes of the resulting errors become negligible.

Setting these considerations aside, it is observed in these studies by Eisner, et al., that source location is poorly constrained in the vertical direction for vertical arrays, particularly when aperture is small. This can be readily understood by the directional information interpretation discussed previously for distance-based estimates of source location. Additionally, as depicted in FIG. 3 of [1], error regions for sources located below a vertical linear array are observed to increase in size and tilt toward the center of an array. This tilt is predicted by our geometric interpretation, and the increase in size corresponds to the decreased aperture caused by a larger source-array distance and an off-center source position, resulting in increasing error in the direction perpendicular to the mean array direction. Events are noted to be most tightly constrained in the radial direction, which is the mean array direction for events which are array-centered as in FIG. 4 of [1], and thus the dimension in which we have described range information to be most heavily concentrated. Additionally, it is observed in [1] and [6] that surface arrays using only P-wave arrivals for source location estimation have poor depth accuracy but good horizontal accuracy. This is corroborated and explained by the results presented previously regarding the use of only P-wave or S-wave arrivals, as depth is the typical source-receiver direction for surface arrays. Finally, it is observed in [1] that receiver density does not influence estimation accuracy much, assuming a reasonable number of receivers. This is explained by the 1/M reduction in estimation variance associated with higher sensor density, which yields diminishing returns for large M.

The trend of increasing localization error with distance noted in [4] is also in accordance with the bounds and geometric interpretations presented here. As observed in [4], signal-to-noise ratio tends to decrease for distant events, and the influence of that phenomena on localization error is quantified here. Furthermore, the orientations of errors, such as in FIG. 3 of [4] where event locations are observed to spread along an upward tilt toward the mean array direction, are well predicted by the geometry described here. As previously mentioned, the varied tilting due to locally viewed mean array directions in multilayered media can be observed in FIG. 6 of [4] as well, with a local stretching of the ellipse within layers according to each layer's velocity that will be a topic of following discussion.

Finally, in [5], a similar analytic technique is used to assess the sensitivity of times of arrival to changes in source location as a method of characterizing source localization accuracy. Here we are able to assess the accuracy of localization directly, rather than appealing to intermediate parameters, and suggest the trace of $J_g^{-1}$, which gives the RMS location error, as an improved measure of local estimation accuracy as compared to the smallest singular value of the SVD used in [5]. Further considerations of array geometry optimization based on the results presented here will be discussed later in this section. We conclude this discussion of previous studies with a few observations regarding source localization error in laterally homogeneous multilayered media which demonstrate that the methodology used in previous studies may have yielded misleading results. The location estimate errors which result from events occurring in layers of different velocities require a somewhat careful analysis, akin to the one given above regarding P-wave and S-wave time of arrival estimation accuracy and associated distance error. For a specified time of arrival error, we expect larger source location errors in a layer with high velocity, due to the simple relation given in (32), $\epsilon_r = \epsilon_T \times v$. This is the case that has been simulated and examined in recent literature [4,7,8]. However, because we expect that the fracture mechanism that gives rise to transient microseismic event waveforms occurs over some distance for each detectable event and accordingly radiates a disturbance in the surrounding rock, it is important to note that for an event occurring in a higher velocity layer the resulting waveforms which propagate away from the physical deformation will contain correspondingly higher frequency content. This is analogous to the relationship between P-wave and S-wave frequency content in a single velocity layer: because S-waves propagate at a velocity which is slower than P-waves, they contain energy content which is accordingly downshifted in frequency.

Ignoring the impact of frequency-dependent propagation loss, we can, by (28) and (29), expect to perform proportionately more accurate time of arrival estimates on events propagating from higher velocity layers. In this case, however, the increased accuracy in these time of arrival estimates is exactly cancelled by the increase in distance error associated with the higher velocity in the source layer, and thus, we can expect the resulting distance error to be the same for sources localized in any given layer when the source layer's velocity is properly taken into account. In this way, error plots generated by the perturbation of time of arrival estimates as presented in [4,7,8] may depict misleadingly large location errors in high velocity layers because the expected improvement in time of arrival estimation for events originating in those layers is not properly accounted for. In reality, greater attenuation of higher frequencies during propagation through the earth may result in smaller percentages of signal energy reaching the sensor array for events generated in high velocity layers because of their higher center of frequency content. In this case, the associated improvement in time of arrival estimates will not be enough to make up for the translation to greater distance errors, and some increase of error in high velocity layers will be seen. Note that this increased error largely results from frequency-dependent propagation losses though, and is not well accounted for in studies which simply introduce a uniform error into time of arrival estimates.

D. Implications for Estimation Techniques

The derived expressions for the Fisher information of intermediate parameters such as times of arrival, source distance, and angle of arrival estimates, $$J_{\tau_p} = DSNR_p \cdot I, \quad (45)$$

$$J_{\tau_a} = DSNR_s \cdot I, \quad (46)$$

$$J_r = ESNR \cdot I, \quad (47)$$

$$J_\phi = SNR \cdot I, \quad (48)$$

combined with the ways in which they contribute to location estimation accuracy given by (33), $$J_g = B^\tau J_\tau B + B^{\perp \tau} \text{diag}\{r\}^{-1} J_\phi \text{diag}\{r\}^{-1} B^\perp$$

reveal optimal weightings which should be given to data within a set of observed geophone signals when estimating times of arrival, source distance, angles of arrival, and finally source location. These weightings are not currently applied in microseismic localization, leading to degradation of source location estimate accuracy.

Basic examples of such weightings can be seen in the expressions derived for the Fisher information of time of arrival and angle of arrival estimates. These are values which are commonly estimated directly from observed data, and while various noise reduction techniques may be applied to aid in estimation, the results found here present a particular processing for maximum likelihood least-squares estimation of these parameters: that the information from each frequency bin shall be weighed according to either its particular DSNR or SNR. In practice, this means that noise spectra should be estimated when event signals are not present and used to estimate these energy ratios given the spectra of observed events when performing either of these calculations in the frequency domain. An equivalent procedure in the time domain would be to measure the autocorrelation of the noise present and apply a corresponding whitening filter. These procedures would then yield, in the small error region of operation, maximum likelihood estimators which estimate these parameters with the minimum bound variance given by the information inequality, for the model and assumptions used in the derivation here.

Along similar lines, we previously mentioned that increasing the number of sensors present within a given array span will decrease the size of resulting error ellipsoids roughly by the inverse of the sensor count while approximately maintaining their shape. This will only hold if, as we assumed above, the noise present is independent sensor to sensor. In reality, noise spectra may become correlated sensor-to-sensor, especially at frequencies where sensor spacing is small relative to the associated wavelength. To account for this, the derivations presented above could be carried out with an arbitrary noise covariance matrix left in (17), yielding expressions for the bound variances in terms of the noise covariance matrix rather than just the inverse of the noise power at each frequency. These expressions would then similarly imply the weightings associated with maximum likelihood estimators of the parameters, in terms of the inverse of the given noise covariance matrix, which could be estimated from collected data and used when estimating parameters. Such an estimator would similarly achieve its associated lower bound variance in small error conditions, and is more realistic than the case illustrated above of uncorrelated noise.

One weighting revealed by our derivations above seems to be of particular importance due to the fact that it indicates a possible improvement over common practices in microseismic processing: how to combine separately estimated P-wave and S-wave time of arrival estimates when estimating source location. Using the RMS time of arrival residual mentioned above as a cost function to be minimized when estimating source location fails to account for the fact that we should expect to achieve different time of arrival estimation accuracies for the P-wave and S-wave of a given microseismic event observation. Because of this, we should weigh the residuals by our relative confidence in the P-wave and S-wave time of arrival estimates, such that we are willing to accept proportionately more error between the hypothesized set of arrival times and arrival times which we cannot estimate accurately.

This observation grants the intuition that we should weigh the P-wave and S-wave arrival time residuals by the inverse of their respective lower bound variances: their DSNRs. Because the maximum likelihood estimator will approximate the lower bound variance under reasonable signal and noise conditions as mentioned above, we can expect to estimate P-wave and S-wave arrival times with accuracy given by the bounds presented in (28) and (29). Thus, we penalize more for disagreements between hypothesized and estimated arrival times where we are more confident of our time of arrival estimate. To confirm this intuition, we may compare the accuracy of location estimates resulting from the minimization of unweighted RMS time of arrival residual to those found by minimization of properly weighted RMS residuals, revealing that the weighting proposed herein will yield estimates that achieve the lower bound variance for location estimates based on distances given by (37), and will in fact always be more accurate than unweighted estimates.

Equivalent to minimizing the RMS time residual between sets of estimated and hypothesized arrival times is the problem of minimizing the mean square residuals, or in other words, the mean square error, between the two. Given a set of P-wave and S-wave arrival times estimated from observed data, $\tilde{\tau}_p$ and $\tilde{\tau}_s$, and a set of hypothesized arrival times generated for a potential source location $\xi$ by forward modeling or equivalent means, $\tau_p(\xi)$ and $\tau_s(\xi)$, we denote by $C(\xi)$ the weighted sum of square differences between the two sets of arrival times, $$C(\xi)=(\tilde{\tau}_p-\tau_p(\xi))^\tau W_p(\tilde{\tau}_p-\tau_p)(\xi))+(\tilde{\tau}_s-\tau_s(\xi))^\tau W_s(\tilde{\tau}_s-\tau_s(\xi)) \quad (49)$$

where $W_p$ and $W_s$ represent positive definite weightings of the P-wave and S-wave times of arrival, respectively. The position estimate $\hat{\xi}$ which minimizes the cost $C(\xi)$ is then characterized by $$\left.\frac{\partial C}{\partial \xi}\right|_\xi = 0 \quad (50)$$

Additionally, in a small neighborhood about the true position $\xi$, the column of distances between the source and geophones may be approximated by $$r(\hat{\xi}) \approx r(\xi) + \frac{\partial r}{\partial \xi^\tau}(\hat{\xi} - \xi) \quad (51a)$$

Substituting into (50), and taking the expectation of outer products, we may derive an expression for the variance of the least-squares estimate, $$\text{var}\{\hat{\xi}\} = \left[B^\tau\left(\frac{W_p}{v_p^2} + \frac{W_s}{v_s^2}\right)B\right]^{-1} \left[B^\tau\left(\frac{W_p \sum_p W_p}{v_p^2} + \frac{W_s \sum_s W_s}{v_s^2}\right)B\right] \left[B^\tau\left(\frac{W_p}{v_p^2} + \frac{W_s}{v_s^2}\right)B\right]^{-1} \quad (51b)$$

where $\tau_p$ and $\Sigma_s$ are the P-wave and S-wave time of arrival measurement covariances. It can be shown that the variance above is at least as large as the variance $$\left[B^\tau\left(\frac{\sum_p^{-1}}{v_p^2} + \frac{\sum_s^{-1}}{v_s^2}\right)B\right]^{-1} \quad (51c)$$

Which is achieved using the weighting matrices $W_p = \Sigma_p^{-1}$ and $W_s = \Sigma_s^{-1}$.

Assuming for simplicity that the arrival time covariance matrices and weighting matrices are proportional to identity, $$\Sigma_p = \sigma_p^2 I, \Sigma_s = \sigma_s^2 I, \quad (52)$$

$$W_p = \omega_p I, W_s = \omega_s I \quad (53)$$

for positive weightings $w_p$ and $w_s$, the least squares estimate variance is $$\text{Var}\{\hat{\xi}\} = (B^\tau B)^{-1} \frac{\left(\frac{w_p^2 \sigma_p^2}{v_p^2} + \frac{w_s^2 \sigma_s^2}{v_s^2}\right)}{\left(\frac{w_p}{v_p^2} + \frac{w_s}{v_s^2}\right)^2} \quad (54)$$

Note that our previous derivation of arrival time estimation accuracy for the case of uncorrelated noise and P-wave and S-wave pulses yielded arrival time covariance matrices of this form, as given in (28) and (29), and thus corresponds to the estimation case studied here. If the arrival time errors are unweighted, $w_p = w_s = 1$, as is common practice, the estimate variance becomes $$\text{Var}\{\hat{\xi}\} = (B^\tau B)^{-1} \frac{\left(\frac{\sigma_p^2}{v_p^2} + \frac{\sigma_s^2}{v_s^2}\right)}{\left(\frac{1}{v_p^2} + \frac{1}{v_s^2}\right)^2} \quad (55)$$

If, on the other hand, the arrival times are weighted according to their inverse variances, $w_p = 1/\sigma_p^2$, $w_s = 1/\sigma_s^2$, we have $$\text{Var}\{\hat{\xi}\} = (B^T B)^{-1} \left( \frac{1}{\sigma_p^2 v_p^2} + \frac{1}{\sigma_s^2 v_s^2} \right)^{-1} \quad (56)$$

While the expression stated in (56) may appear unfamiliar at first glance, let us examine what would happen if we were able to estimate our P-wave and S-wave times of arrival efficiently; that is, with variance given by the lower bounds (28) and (29) derived above. In that case, we have $$\sigma_p^2 = \frac{1}{DSNR_p} \quad (57)$$

$$\sigma_s^2 = \frac{1}{DSNR_s} \quad (58)$$

which correspond to the weightings $w_p = DSNR_p$ and $w_s = DSNR_s$, and (56) becomes $$\text{Var}\{\hat{\xi}\} = (\text{ESNR } B^T B)^{-1} \quad (59)$$

where we have used the definition of ESNR given in (21).

Comparing this resulting location estimate variance with that given in (37), we see that this weighted least squares estimate achieves the lower bound variance given by the information inequality for source location estimates which do not use angle of arrival information. By contrast, the unweighted estimate has larger variance by a factor equal to the product of the weighted mean P-wave and S-wave arrival time variances and inverse variances, $$\frac{\frac{1}{\sigma_p^2 v_p^2} + \frac{1}{\sigma_s^2 v_s^2}}{\frac{1}{v_p^2} + \frac{1}{v_s^2}} \cdot \frac{\frac{\sigma_p^2}{v_p^2} + \frac{\sigma_s^2}{v_s^2}}{\frac{1}{v_p^2} + \frac{1}{v_s^2}} \quad (60)$$

Figure 11:
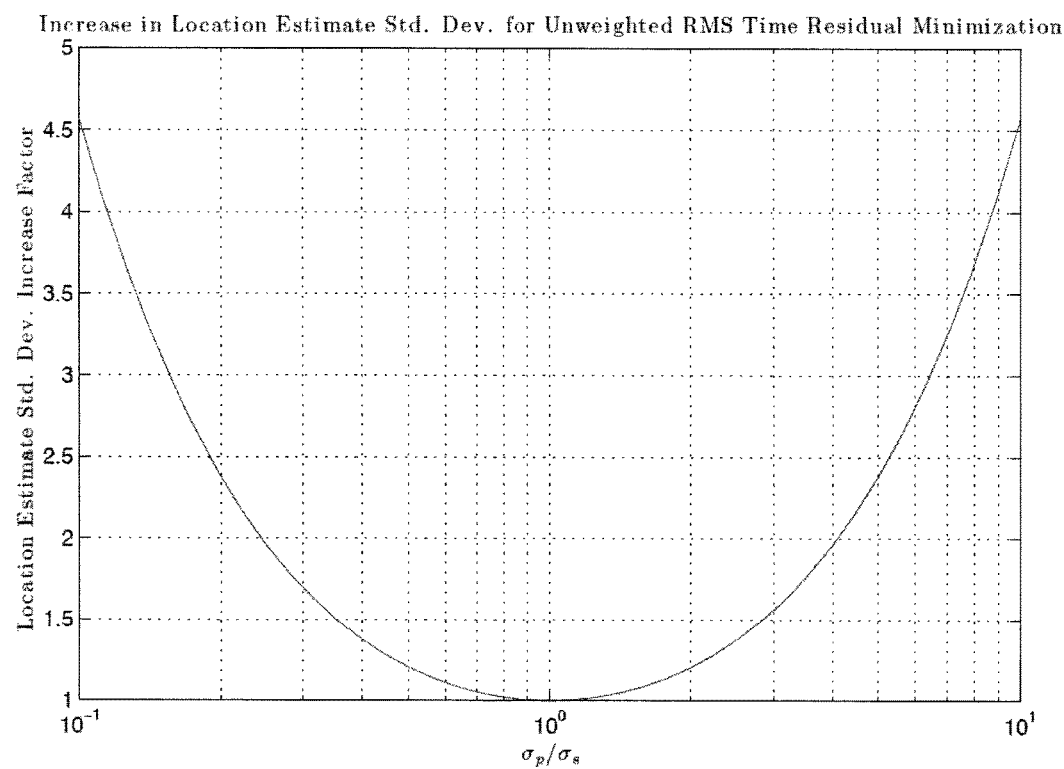
FIG. 11 is a plot illustrating how source location estimate standard deviation increases when minimizing unweighted RMS (Root-Mean-Squared) TOA (Time-Of-Arrival) error compared to that of minimizing an optimally weighted RMS TOA error according to embodiments of the invention.

FIG. 11 shows the square root of this ratio as a function of $\sigma_p/\sigma_s$, illustrating that for all possible time of arrival estimate accuracies, minimizing the unweighted RMS time residual results in source location estimates of equal or greater standard deviation, and thus error, than the optimal weighting presented here. Equality in resulting location estimation error occurs only when the two minimizations are equivalent; that is, when the P-wave and S-wave time of arrival estimates have the same variance.

More particularly, FIG. 11 shows the factor by which source location estimate standard deviation is increased when minimizing the unweighted RMS time of arrival error between hypothesized and separately estimated P-wave and S-wave arrival times (as is common practice) instead of the optimally weighted RMS error presented here. We can see that location estimate error is always larger when no weighting is applied, except for when P-wave and S-wave time of arrival estimates have the same standard deviation, where the two weightings are the same. A ratio of $v_p = v_s = 1:1.6$ was used to generate FIG. 11. Slightly different velocity ratios produce very similar curves.

While our discussion of relative time of arrival estimate accuracy given above indicates that the ratio $\sigma_p^2/\sigma_s^2$ will not generally be one, and thus this optimal weighting will provide improved estimates, we do note that this ratio will tend to be reasonably close to one, and so the common practice of minimizing the unweighted RMS time residual, while introducing unnecessary estimation error and reflecting bad practices, tends to increase location estimation variance by relatively small amounts. Performing a more detailed derivation of the bounds presented above that maintained an arbitrary noise covariance matrix would be expected to yield an analogous weighting method in which the optimal weighting matrices $W_p = \Sigma_p^{-1}$ and $W_s = \Sigma_s^{-1}$ would not necessarily be diagonal and which would provide an even larger improvement in resulting location estimate accuracy in the presence of noise which is correlated or varies in power spectrum from sensor to sensor as compared to the non-weighted minimization. In practice, we can estimate the variances of separately estimated P-wave and S-wave times of arrival for use in weighted minimization by separately calculating their respective variances around a set of hypothesized P-wave and S-wave arrival times or estimating DSNR properties for events.

As a final consideration regarding estimation techniques, the previous discussion of optimal source location estimation from a set of intermediately estimated parameters, $\tau_p$ and $\tau_s$, presents an opportunity to discuss the concept of efficient estimators in more detail. One vital assumption made in our derivation of the optimal weighting was that we could estimate our P-wave and S-wave arrival times efficiently, or with variance approximating the lower bound given by the information inequality, yielding the statements given in (57) and (58). Only then, with the proper weighting, could we achieve an efficient estimator for source location and reach the lower bound variance associated with extracting all distance information from our signal model, resulting in the distance estimate term of (37). Although it is not proven here, it can be reasonably inferred that if we are unable to achieve the lower bound variance in our estimates of times of arrival, we will accordingly be unable to use those intermediate time of arrival parameters to achieve the lower bound in location estimation error, as not even the optimal weighting will result in a location estimator which achieves the bound variance.

A formal treatment of this topic is omitted here for sake of clarity of the invention, but the essential observation is that the use of intermediate parameters estimated from a set of observations, such as times of arrival, which fully capture all information in those observations regarding some derived quantity or observable property, such as source distance, allow for estimates of the secondary quantity which approximate its bound variance in accuracy only when the intermediate parameters themselves can be estimated with accuracy approximating their bound variance. In this sense, the ability to efficiently estimate intermediate parameters like times of arrival is essential to accurate source location estimation if they are to be used. As described above, the maximum likelihood estimator for a parameter describing a set of observations will approximate the bound variance and be efficient in the small error region, or equivalently, in the presence of large Fisher information for those parameters. Thus, we can conclude that times of arrival will only allow efficient estimates of source location in the presence of good DSNRs.

In poor DSNR conditions, large errors such as picking incorrect peaks due to considerable noise in observed signals will prevent efficient estimation of times of arrival, and source location estimation accuracy will suffer accordingly. The alternative to such intermediate parameters is to attempt to utilize the full observations, given a particular signal model, to achieve the lower bound for estimation variance of the final desired parameter directly, as originally derived for distance above and presented in (25). An example of a method which does this and is currently popular in the microseismic monitoring community is to hypothesize a set of arrival times by forward modeling of wave propagation and/or ray tracing and then evaluate the semblance function for windowed portions of the P-wave and S-wave at these hypothesized times.

Forward modeling of arrival times, for example by wave propagation and/or ray tracing, essentially captures the full relation between P-wave and S-wave arrivals, constraining them to correspond to propagation times from a potential source location rather than estimating them separately. Additionally, calculation of the semblance function over corresponding windowed portions of the observed signal approximates comparison of the full arriving pulse between geophones (where real world issues such as multi-path reflections force a windowing procedure). In fact, it can be shown that maximization of the semblance function for times of arrival calculated in this way will achieve the bound variance for location estimation accuracy, for the model and simplifying assumptions used here. Because this semblance based method works with the information in the signal directly rather than through the estimation of intermediate parameters, it is expected to be more robust, and yield source location estimates with accuracy that approximates the location estimate bound variance at lower DSNRs than time of arrival estimation based methods. While this agrees with general observations and seems to be intuitively expected, a more careful examination of the properties of this particular estimation technique are omitted here for sake of clarity of the invention.

Given that techniques which estimate model parameters such as source location directly from observed data will tend to perform at the bound variance in worse signal and noise conditions, one might wonder what benefits there are to using intermediately estimated parameters, if any. In general, estimating quantities such as position via intermediate parameters is much less computationally expensive. This is the case in our example regarding the use of times of arrival and semblance: if we estimate the times of arrival for a set of P-waves and S-waves, we can then perform forward propagation from a proposed source location to generate hypothesized times of arrival and minimize a quantity such as the weighted RMS time residual by simply comparing our previously estimated set of 2M scalar arrival times to the hypothesized times. In contrast, calculating the semblance of portions of the P-wave and S-wave arrivals for each potential source location requires considerably more computation.

Because the use of intermediate parameters like times of arrival will achieve the same accuracy as more computationally expensive methods under conditions where they can be estimated efficiently, their use may be favorable when signal and noise conditions are such that operation within the small error region is expected. If, on the other hand, estimation techniques exist which bypass intermediate parameters and are not prohibitively expensive to use at all times, it may be best to avoid the use of intermediate parameters all together. This trade off between computational cost and reliability in poor signal and noise conditions is the essential trade off that much be considered when determining whether or not to use intermediate parameters during source location estimation.

E. Application to Array Geometry Design

The idea of designing geophone array geometry in order to maximize the sensitivity of observed arrival times to source location is not new, and represents a good first step toward optimal array design; however, as we have demonstrated here, time of arrival accuracy is not a good indicator of source location estimate accuracy in general, and thus is not a parameter which should be used directly in this type of analysis. As mentioned previously, making certain observable parameters maximally sensitive to source location can be considered in some ways similar to maximizing the Fisher information in those parameters, as described above and presented in (16). Accordingly, we propose that microseismic monitoring arrays be designed to maximize the Fisher information for source location, $J_g$, directly, such that we obtain maximum accuracy at estimating the observable parameter we care about most: microseismic event location.

Fortunately, the analytic framework presented here provides a mechanism by which we can do this. Unlike largely qualitative studies of the effects of SNR and error geometry, we have demonstrated here how to derive quantitative expressions relating source-sensor geometry and signal and noise properties to maximum source location estimation accuracies given a particular signal model. With the inclusion of models for effects like propagation loss, source radiation patters, spreading loss, and more complex layered medium effects, it is relatively straightforward to design optimization procedures for arbitrary geophone array design by specifying a desired cost function based on weightings of particular error geometries (such as if vertical or horizontal resolution is of particular importance in a certain velocity layer), total RMS location error in particular regions of space, or nearly any other quantifiable accuracy measure which one may hope to constrain or minimize. While the solving of such formulated optimization problems would be subject to the same potential difficulties as any other theoretical or numerical optimization procedure, such optimizations could potentially accommodate any combination of system design constraints that might exist for a microseismic monitoring project such as limited potential deployment zones, limited number of sensors, restricted individual sensor array geometries (such as only using linear vertical arrays), predetermined spacing between sensors within an array, or any other parameter of system configuration that cannot be adjusted due to legal or mechanical restrictions.

Propagation Velocity Uncertainty

Thus far, we have assumed exact knowledge of the P-wave and S-wave propagation velocities, $v_p$ and $v_s$, leading to localization errors that resulted only from additive noise present in the observed geophone signals. In reality, these velocities must be measured through the use of sonic logs, VSP, or other means, and accordingly suffer from an associated measurement uncertainty. In the following, we present an expression for the increase in variance of least-squares position estimates resulting from this variance in measured propagation velocities. We then consider simultaneously estimating velocity and position. We will see that position estimates may develop a significant variance component along the average source-geophone array direction when assuming a measured velocity is true instead of associating it with an appropriate uncertainty, but that these additional errors can be greatly mitigated by treating the propagation velocity as an additional parameter to be estimated from observations of microseismic events. During this discussion, keep in mind that an exactly analogous discussion applies to other measured model parameters such as sensor locations and orientations.

In order to assess how an incorrectly measured velocity impacts source location error when it is assumed to be true, we will examine the variance which results from an optimally weighted estimate of source location based on previously estimated times of arrival. For simplicity, we assume that the ratio of the P-wave and S-wave velocities is known and accurate, and that the geometric mean of their slownesses, given by $$1/v = 1/\sqrt{v_p v_s}$$

referred to here simply as the medium's propagation slowness, is drawn from a Gaussian probability density with variance $\sigma_{1/v}^2$. Omitting the derivation, we have that the variance of optimally weighted least-squares estimates of position, made with regard to propagation velocity inaccuracies is then (in the presence of small errors)

$$\text{Var}\{\hat{\xi}\} = (B^\top B)^{-1} \left( \frac{1}{\sigma_p^2 v_p^2} + \frac{1}{\sigma_s^2 v_s^2} \right)^{-1} + v^2 \sigma_{1/v}^2 (B^\top B)^{-1} B^\top r r^\top B (B^\top B)^{-1} \quad (61)$$

Comparing (61) to (56), we see that the variance is increased by an additive term which is proportional to the slowness variance, the medium's propagation speed, and the source-sensor distances. Note that the additional variance is along the average source-geophone direction, as given by the $B^T B$ term. This is expected, as uncertainties in speed directly impact range measurements.

It is important to note here that this is the location estimate variance which occurs when we take a measured propagation velocity to be true (assume $\sigma_{1/v}^2 = 0$) regardless of the fact that the measured velocity does indeed have variance $\sigma_{1/v}^2$ due to measurement inaccuracies. The resulting location estimate variance illustrated in (61) is how this uncertainty would then translate to location uncertainty. In reality, for any one velocity measurement a single systematic error in source locations along the mean source-receiver direction would occur; however, because we cannot in practice know the amount of this shift, the overall effect is to introduce an amount of uncertainty in our source location estimates according to the probabilities of shifts caused by our inaccurate velocity measurement. This type of velocity error appears to be the one more widely studied in the microseismic literature. Note that in the case of multiple velocity layers which are each perturbed randomly, the orientation of errors may not appear to lie along the mean source-array direction because the effective locations of the sensors for a particular source location may change substantially as the velocities of each layer vary, as previously mentioned above.

Although the conceptual distinction may be a bit subtle, the previously illustrated case of location errors which result from treating inexactly measured velocities as exact is different from the case where we actually take our measured velocity to have an uncertainty associated with it. In this case, we do not assume to have complete information regarding propagation velocity and instead treat it as an additional parameter to be estimated from our observations. In doing this, we may solve for source positions which minimize weighted RMS time of arrival residuals over not just all potential locations but all velocities as well, with an appropriately weighted cost being placed on velocities that differ greatly from our original measured velocities. Similarly to our discussion of estimating source location from separately made time of arrival estimates above, the cost we associate with using velocities that differ from our original measurements should depend on the amount of confidence we have in our velocity measurements, and will thus depend on the uncertainty inherent in our measurement techniques.

Compared to the previously examined case of assuming an inexactly measured velocity to be a completely certain and true velocity, considering propagation velocity as an observable parameter with some uncertainty can result in significantly reduced source location errors and represents a fundamentally better approach to both source location and velocity estimation.

In order to gauge the effect of our uncertainty in velocity on our ability to estimate source location when acknowledging this uncertainty, as compared to having complete knowledge of the true value, the information inequality may be derived for the simultaneous estimation of position $\xi$ and velocities $v_p$ and $v_s$ by using (17) to form $J_{\xi,\psi,vs,vp}$. If we then want to incorporate information from independent measurements of $v_p$ and $v_s$ having measurement variance of $\sigma_{1/v}^2$, we can add terms $1/\sigma_{1/v}^2$ to the $v_p$ and $v_s$ blocks of $J_{\xi,\psi,vs,vp}$. In the absence of prior velocity information (equivalent to $\sigma_{1/v}^2 = \infty$), it can be shown that the position Fisher information present in our observations is reduced compared to the case that true velocities are known a priori, decreasing from the previous value, denoted $J_\xi$, to a new value of $$J_\xi - \text{DSNR}_p B^\top P_r B - \text{DSNR}_s B^{\perp^\top} P_r B_\perp \quad (62)$$

where $P_r = rr^T/r^Tr$ is a projection onto the column of source-sensor distances.

The reduction in Fisher information (and corresponding increase in source location estimate variance) appears both along and perpendicular to the average source-geophone direction, and should increase the size of the source location error ellipse without affecting its shape in a significant way. Thus, having to estimate the propagation velocities with no prior independent measurements increases source localization error in a fairly uniform way as compared to knowing the true values. It can be shown, however, that given independent measurements of velocity, the source localization error which results from this estimation technique will be significantly smaller than that given by (61), where the measured velocities are assumed to be completely accurate. Naturally, in both cases the resulting source localization error remains larger than the case examined in the bulk of this disclosure where the true propagation velocities were assumed to be known.

Before concluding, it should be pointed out that for a set of nearby microseismic events, say from a single stage of well treatment, the propagation velocities should be very similar. In this case, a pair of consistent propagation velocities may be estimated simultaneously with the entire set of event positions. In the case that no previous velocity has been estimated for the region this procedure will provide an estimate of the velocity, as constrained by the P-wave and S-wave velocity ratio and common source mechanism assumptions. Alternatively, if a velocity has previously been measured for the propagation region, this procedure will decrease the variance of the position estimates as compared to those which would result from treating the measured velocity as absolutely correct, while simultaneously providing an improved velocity estimate. Such methodology represents a fundamentally better way of estimating event locations given previous measurements of propagation velocities, and could even potentially be used to allow for the study of local propagation velocity changes over the course of a treatment from microseismic event observations. Finally, we note that the same philosophy presented here for uncertainty in velocity model measurements can be readily applied to any additional/other measured model parameters such as sensor locations and orientations. Such parameters are typically assessed through the use of mechanical measurements or check shots and thus also have an associated uncertainty. By simultaneously estimating the sensor locations and orientations along with the entire set of observed microseismic events, it is analogously possible to improve our estimates of sensor locations and orientations while simultaneously decreasing the effective uncertainty in resulting event location estimates as compared to assuming our originally established sensor orientations and locations were absolutely correct.

Straightforward extensions of the results presented here to the three-dimensional case and inhomogeneous media were discussed, implications for optimal estimation techniques are described herein, and the use of this framework in optimal sensor array design was described. Finally, considerations of uncertain propagation velocities have been discussed, with a note that the presented philosophy can be readily applied to other uncertain model parameters such as sensor locations and orientations to yield further improvements in source localization accuracy. The general three-dimensional estimation case and these many related topics can be derived through application of the analytic framework presented here, and are all within the scope of the present invention.

Figure 12:
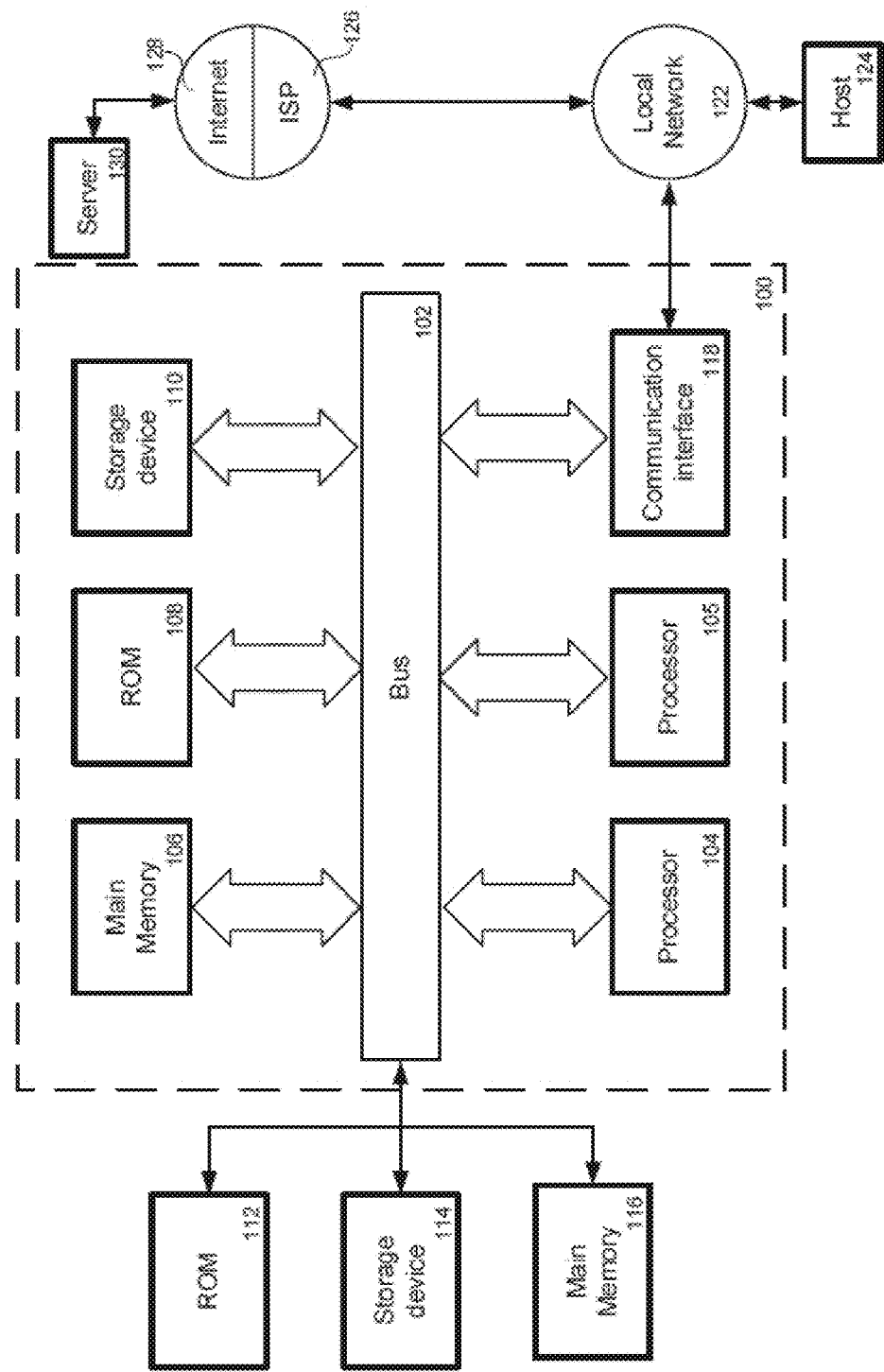
FIG. 12 is a block diagram of a computer system that can be used to implement certain methodologies according to embodiments of the invention.

FIG. 12 is a block diagram that illustrates a computer system 100 which can assist in the microseismic event methodologies disclosed herein. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

In certain embodiments, portions of the methods of the invention may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In certain embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media and volatile media. Non-volatile media include, for example, optical or magnetic disks, such as storage device 110. Volatile media include dynamic memory, such as main memory 106. Common forms of computer-readable media include, for example, a floppy disk, a flexible disk, hard disk, magnetic tape, any other magnetic medium, a CD-ROM, DVD, Blu-Ray any other optical medium, a RAM, a PROM, and EPROM, a FLASH-EPROM, any other memory chip or cartridge, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. According to certain aspects of the invention a downloaded application can provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for evaluating quality of an estimate of a location of a microseismic event, comprising:
   accepting, by a computer, the position of a sensor capable of receiving a seismic signal comprising an event signal and a noise signal, the seismic signal being associated with the microseismic event in connection with a microseismic survey of a subsurface region;
   determining a parameter that describes a feature of the event signal and that relates the sensor position to the location of the microseismic event;
   accepting, by the computer, information about the noise signal; and
   quantifying, by the computer that accepts the sensor position and the information about the noise signal, how the parameter changes in response to a change in an aspect of the microseismic event location, so as to assist in evaluating the quality of the estimate of the location of the microseismic event.

2. A method according to claim 1, wherein the information about the noise signal includes one or more of signal to noise ratio, source/event signal component level, noise component level, and noise axis.

3. The method of claim 1, wherein the feature includes one or more of arrival time of the event signal at the sensor, propagation path length of the event signal to the sensor, an aspect of polarization of the event signal at the sensor, and an aspect of arrival direction of the event signal at the sensor.

4. The method of claim 1, wherein the event signal includes one or more of a P-wave, an S-wave, a P-headwave, a S-headwave, a reflected P-wave and a reflected S-wave.

5. The method of claim 1, further comprising:
   estimating the accuracy of the microseismic event location using the quantified change in the parameter and the information about the noise signal.

6. The method of claim 5, wherein estimating includes determining an information equality variance.

7. The method of claim 5, wherein estimating includes determining a least squares estimate variance.

8. The method of claim 5, wherein estimating includes determining an inverse variance.

9. The method of claim 1, wherein the sensor comprises one of a one-axis array of sensors.

10. The method of claim 1, wherein the sensor comprises one of a three-axis array of sensors.

11. The method of claim 1, wherein quantifying includes considering a propagation velocity uncertainty of the event signal.

12. The method of claim 1, wherein the seismic signal is one of a plurality of signals associated with the microseismic event, the method further comprising respectively weighting the plurality of signals.

13. The method of claim 12, wherein the plurality of signals are received at the same sensor.

14. The method of claim 13, wherein the plurality of signals comprise one or more of a P-wave and an S-wave.

15. The method of claim 12, wherein the plurality of signals are received at two or more sensors.

16. The method of claim 1, wherein the event signal includes a plurality of types of information associated with the microseismic event, the method further comprising respectively weighting the plurality of types of information.

17. The method of claim 16, wherein the types of information include one or more of wave signal data and arrival times.

18. A method, comprising:
   receiving data corresponding to a signal related to a microseismic event from a sensor, the signal being associated with a microseismic event in connection with a microseismic survey of a subsurface region;
   identifying information about noise affecting the signal;
   deriving a location estimate of the microseismic event from the signal; and
   determining an aspect of a bound on the variance of the location estimate using the noise information and information about a change in a feature of the signal that is computed based on the location estimate, so as to assist with an evaluation of the quality of the derived location estimate, wherein the feature relates a position of the sensor to the location estimate.

19. The method of claim 5, further comprising determining an error ellipse around the microseismic event location using the estimated accuracy.

20. The method of claim 18, further comprising determining an error ellipse around the location estimate using the determined bound on the variance.

\* \* \* \* \*